(12) United States Patent
Havlovitz et al.

(10) Patent No.: US 12,193,427 B2
(45) Date of Patent: Jan. 14, 2025

(54) INSECT TRAP

(71) Applicant: Scotts Canada Ltd., Toronto (CA)

(72) Inventors: Paul M. Havlovitz, Dublin, OH (US); Darryl Ramoutar, Delaware, OH (US); Michael Anthony Ceddia, Dublin, OH (US); Matthew R. Rawlings, Marysville, OH (US); Gerhard J. Gries, Coquitlam (CA); Regine M. Gries, Coquitlam (CA); Jean Pierre Lafontaine, Delta (CA); John Harvey Borden, Burnaby (CA); Robert A. Britton, North Vancouver (CA); Sydney E. Crawley, Dublin, OH (US)

(73) Assignee: Scotts Canada Ltd., Toronto (CA)

( * ) Notice: Subject to any disclaimer, the term of this patent is extended or adjusted under 35 U.S.C. 154(b) by 635 days.

(21) Appl. No.: 16/626,609

(22) PCT Filed: Jun. 29, 2018

(86) PCT No.: PCT/IB2018/000844
§ 371 (c)(1),
(2) Date: Dec. 26, 2019

(87) PCT Pub. No.: WO2019/002948
PCT Pub. Date: Jan. 3, 2019

(65) Prior Publication Data
US 2020/0154690 A1    May 21, 2020

Related U.S. Application Data

(60) Provisional application No. 62/527,528, filed on Jun. 30, 2017.

(51) Int. Cl.
*A01M 1/10* (2006.01)
*A01M 1/04* (2006.01)
(Continued)

(52) U.S. Cl.
CPC ............. *A01M 1/04* (2013.01); *A01M 1/103* (2013.01); *A01M 1/14* (2013.01); *A01M 1/2011* (2013.01)

(58) Field of Classification Search
CPC .......... A01M 1/00; A01M 1/02; A01M 1/023; A01M 1/103; A01M 1/14; A01M 1/2011
(Continued)

(56) References Cited

U.S. PATENT DOCUMENTS 5,983,558 A * 11/1999 Las .................. A01M 1/2011
43/131
6,267,953 B1    7/2001 Bernier et al.
(Continued)

FOREIGN PATENT DOCUMENTS

CN      101252832 A    8/2008
JP       06165630 A    6/1994
(Continued)

OTHER PUBLICATIONS

International Search Report and Written Opinion of the International Searching Authority for Application No. PCT/IB2018/000844 mailed on Nov. 21, 2018 (9 pages).

*Primary Examiner* — Morgan T Jordan
*Assistant Examiner* — Danielle A Clerkley
(74) *Attorney, Agent, or Firm* — Frost Brown Todd LLP

(57) ABSTRACT

An insect trap may include a first housing; a reservoir at least partially defined by the first housing; a protrusion disposed within the reservoir and extending inward from an interior surface of the first housing, the protrusion configured to pierce a package disposed within the reservoir; an actuator connected to the protrusion such that when the actuator is moved, the protrusion moves with the actuator within the reservoir; a second housing moveably engaging the first housing; a trap chamber partially formed by the first and second housings; an inlet into the trap chamber; and wherein the second housing is movable between a first position where the inlet is open and a second position where the inlet is closed. The trap may include a package enclosing an attractant composition. The package has a release rate of the attractant composition from about 5 μg per day to about 500 μg per day.

25 Claims, 15 Drawing Sheets

(51) Int. Cl.
*A01M 1/14* (2006.01)
*A01M 1/20* (2006.01)

(58) Field of Classification Search
USPC .................. 43/107, 114, 121, 132.1, 136
See application file for complete search history.

(56) References Cited

U.S. PATENT DOCUMENTS

| | | | |
|---|---|---|---|
| 7,204,054 B2 * | 4/2007 | Mayo | A01M 1/2011 222/85 |
| 7,892,528 B2 | 2/2011 | Siljander et al. | |
| 8,808,721 B2 | 8/2014 | Banfield et al. | |
| 2007/0044372 A1 | 3/2007 | Lang et al. | |
| 2011/0044936 A1 | 2/2011 | Black et al. | |
| 2011/0047860 A1 | 3/2011 | Black et al. | |
| 2011/0072711 A1 | 3/2011 | Black et al. | |
| 2011/0072712 A1 | 3/2011 | Black et al. | |
| 2011/0088310 A1 * | 4/2011 | Parker | A01M 1/2011 43/132.1 |
| 2011/0203159 A1 | 8/2011 | McKnight | |
| 2012/0110894 A1 * | 5/2012 | Black | A01M 1/026 43/131 |
| 2016/0316750 A1 | 11/2016 | Gries et al. | |

FOREIGN PATENT DOCUMENTS

| | | | |
|---|---|---|---|
| RU | 2445774 C2 | 3/2012 | |
| WO | 01001770 A1 | 1/2001 | |
| WO | WO-2012030717 A2 * | 3/2012 | .............. A01M 1/02 |

* cited by examiner

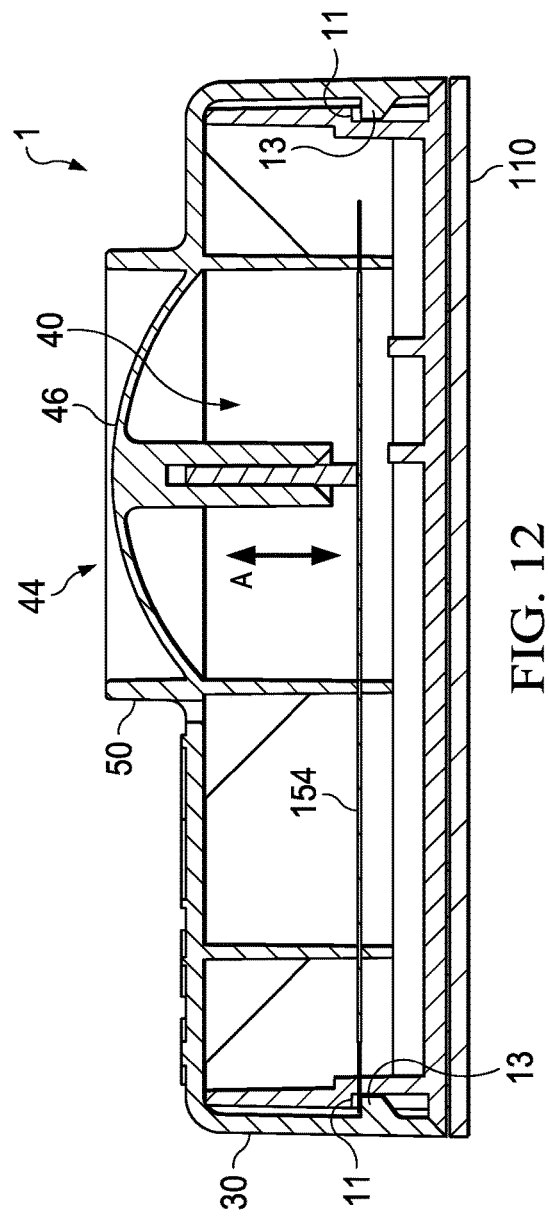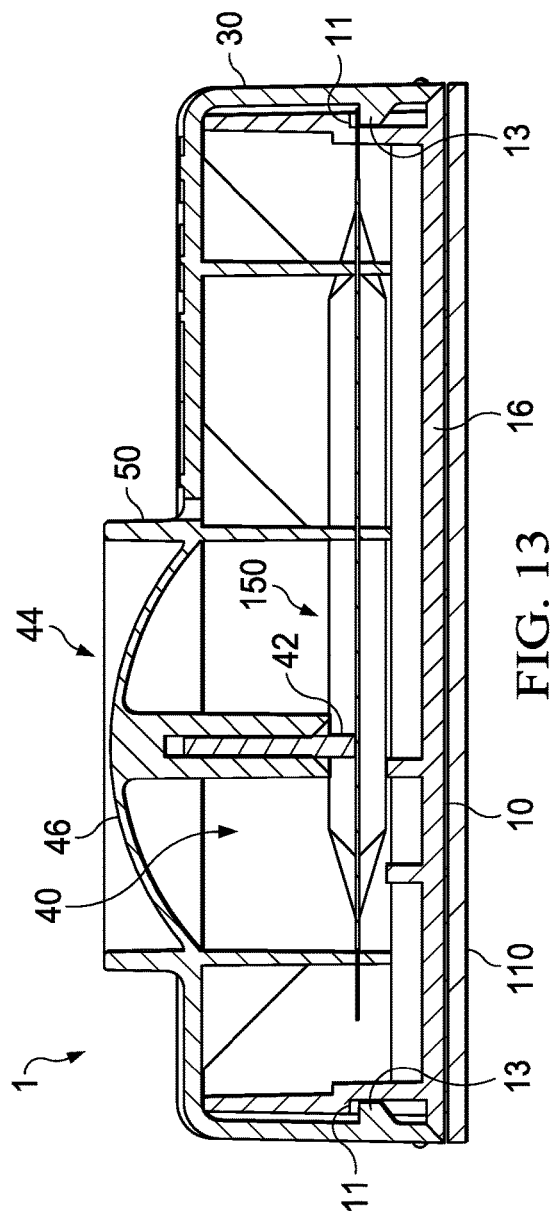

INSECT TRAP

CROSS-REFERENCE TO RELATED PATENT APPLICATIONS

This application is a national stage application under 35 U.S.C. § 371 of International Application No. PCT/IB2018/000844, filed Jun. 29, 2018, which claims the benefit of U.S. Provisional Patent Application No. 62/527,528, filed on Jun. 30, 2017, the disclosures of which are hereby incorporated herein by reference in their entireties.

BACKGROUND

For many years, from the end of World War II until the final decade of the 20th century, much of the world was free from infestation by the common bed bug, Cimex lectularius (Heteroptera: Cimicidae). This is attributed to modern hygienic measures and the widespread use of DDT and other persistent insecticides. However, in the last two decades there has been a world-wide resurgence, with bed bugs becoming common urban pests, and sometimes causing debilitating skin irritation and lesions. This resurgence has renewed interest in detecting, monitoring, and controlling bed bug infestations.

SUMMARY

An insect trap may include a first housing; a reservoir at least partially defined by the first housing; a protrusion disposed within the reservoir and extending inward from an interior surface of the first housing, the protrusion configured to pierce a package disposed within the reservoir; an actuator connected to the protrusion such that when the actuator is moved, the protrusion moves with the actuator within the reservoir; a second housing moveably engaging the first housing; a trap chamber partially formed by the first and second housings; an inlet into the trap chamber; and wherein the second housing is movable between a first position where the inlet is open and a second position where the inlet is closed.

A kit for an insect trap includes a first housing having a first surface, a reservoir disposed within the first housing, a protrusion disposed within the reservoir and extending inward from an interior surface of the first housing, and an actuator disposed upon an exterior surface of the first housing and connected to the protrusion such that when the actuator is moved, the protrusion moves within the reservoir; a second housing moveably engaging the first housing; an attractant configured to attract insects and to be disposed within the reservoir; a substrate comprising an adhesive disposed upon at least a portion of a surface of the substrate, the substrate configured to adhere to the first surface of the first housing; a trap chamber formed by the first housing, second housing, and substrate when the substrate is adhered to the first surface of the first housing; and an inlet providing a passage into the trap chamber; wherein the second housing is movable between a first position where the inlet is open and a second position where the inlet is closed.

An insect trap includes a housing; a reservoir at least partially defined by the housing; a protrusion extending from an interior surface of the housing; an actuator disposed upon the housing and configured to move the protrusion within the reservoir; a trap chamber at least partially formed by the housings and constructed to capture insects; an outer package disposed within the reservoir and impermeable to gas; an inner package enclosed within the outer package, the inner package being permeable to gas; and an attractant composition disposed within the inner package; wherein the inner package is configured to release the attractant composition at a release rate from about 15 µg per day to about 400 µg per day.

An insect trap includes a first housing; a second housing moveably engaged to the first housing; a trap chamber at least partially formed by the first and second housings and constructed to capture insects; an inlet providing a passage into the trap chamber; histamine disposed along or within the housing; and wherein the second housing is movable between a first position where the inlet is open and a second position where the inlet is closed.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein:

FIG. 12 is a cross sectional side view of the trap of FIG. 1 taken at lines 12-12;

FIG. 13 is a cross sectional side view of the trap of FIG. 1 taken at lines 13-13;

DETAILED DESCRIPTION

One or more embodiments shown and described herein provide a trap for capturing and/or trapping insects (e.g., bedbugs), and in particular, traps used in conjunction with effective compounds, compositions and methods for attracting, capturing, and/or arresting bed bugs. Generally, one or more embodiments of an insect trap shown and described herein may include a housing, a reservoir at least partially defined by the housing and configured to hold one or more insect attractants, a protrusion within the reservoir, an actuator configured to actuate the protrusion, a trap chamber at least partially formed by the housing and comprising a floor, and an inlet into the trap chamber. In some embodiments, the trap chamber may include a "pit" (as will be explained below) that the insects entering the trap chamber via the inlet may fall into and are then unable to escape. In some embodiments, the trap chamber may include an adhesive on the floor or ceiling of the trap chamber trapping insects entering the trap chamber via the inlet. In some embodiments, the trap chamber may include some combination of both a "pit" and adhesive to trap the insects. In some embodiments, the trap may include one or more attractants as will be described detail below herein. In one or more embodiments, the housing may be a unitary, monolithic structure or include multiple components making up the housing. Additionally, in one or more of the embodiments, the housing and floor may be a unitary, monolithic structure or include multiple components that are fixedly or removably connectable to each other.

Figure 14:
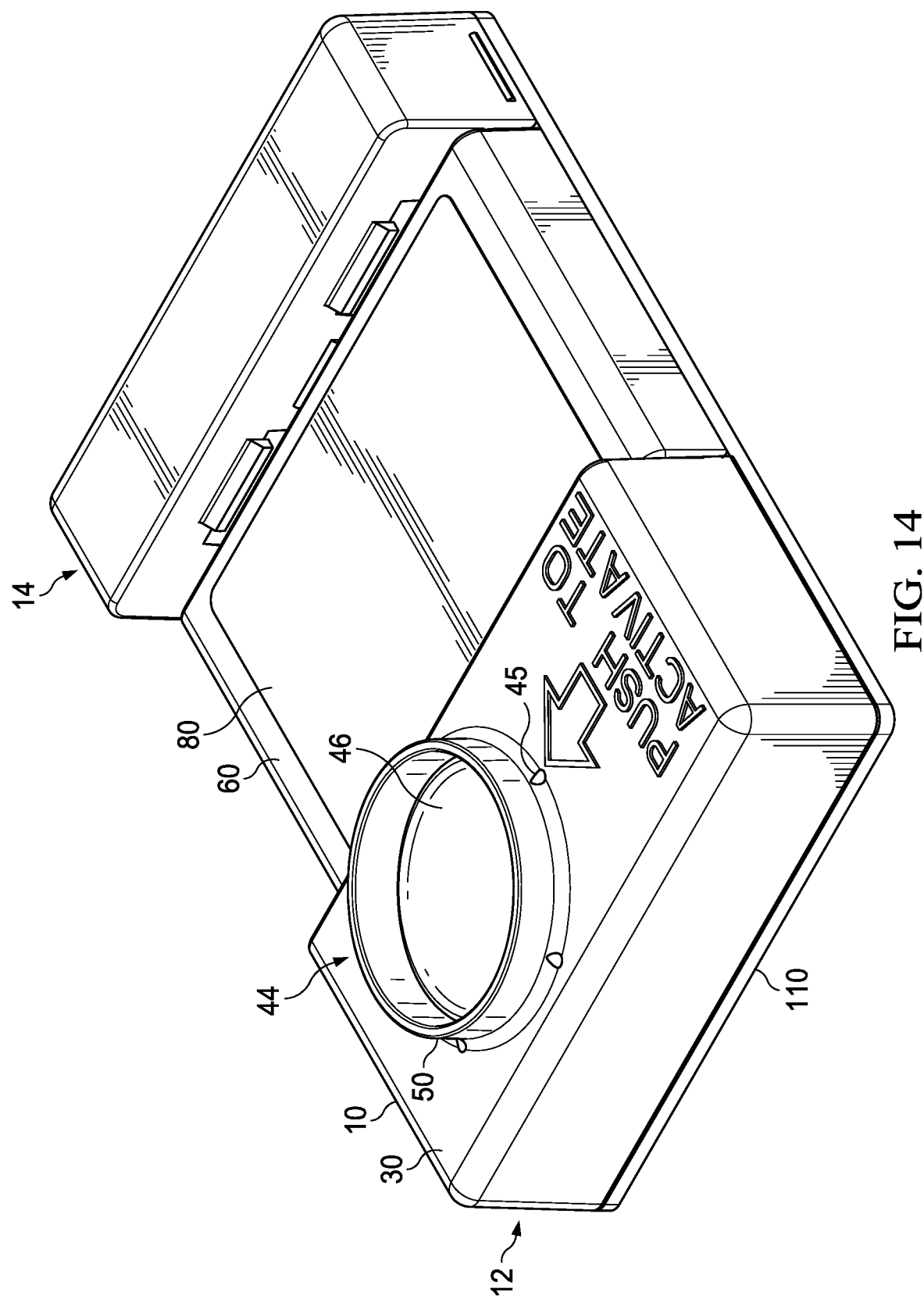
FIG. 14 is an isometric view of an embodiment of the trap of FIG. 1, wherein the second housing is in a second position.

Referring to FIGS. 1-14, an embodiment of an insect trap 1 is shown. The insect trap 1 generally may include a first housing 10, a reservoir 40 at least partially disposed within or defined by the first housing, a protrusion 42 disposed within the reservoir, an actuator 44 connected to and configured to actuate the protrusion, a second housing 60 moveably engaged to the first housing 10, a trap chamber 70 partially formed by the first housing and second housing, and an inlet 72 providing an entrance into the trap chamber. The trap chamber may include a floor 100. In some embodiments, the second housing 60 is configured to move relative to the first housing 10 between at least two positions: a first position (e.g., an open position) and a second position (e.g., a closed position). In the first position, the inlet 72 is open, permitting insects to enter and/or exit the trap chamber 70 shown in FIGS. 1, 4, 5, 10, and 11. In the second position, the inlet 72 is closed, preventing insects from entering and/or exiting the trap chamber 70 shown in, for example, FIG. 14. The trap 1 may include a longitudinal axis (L-L') as shown.

Figure 3:
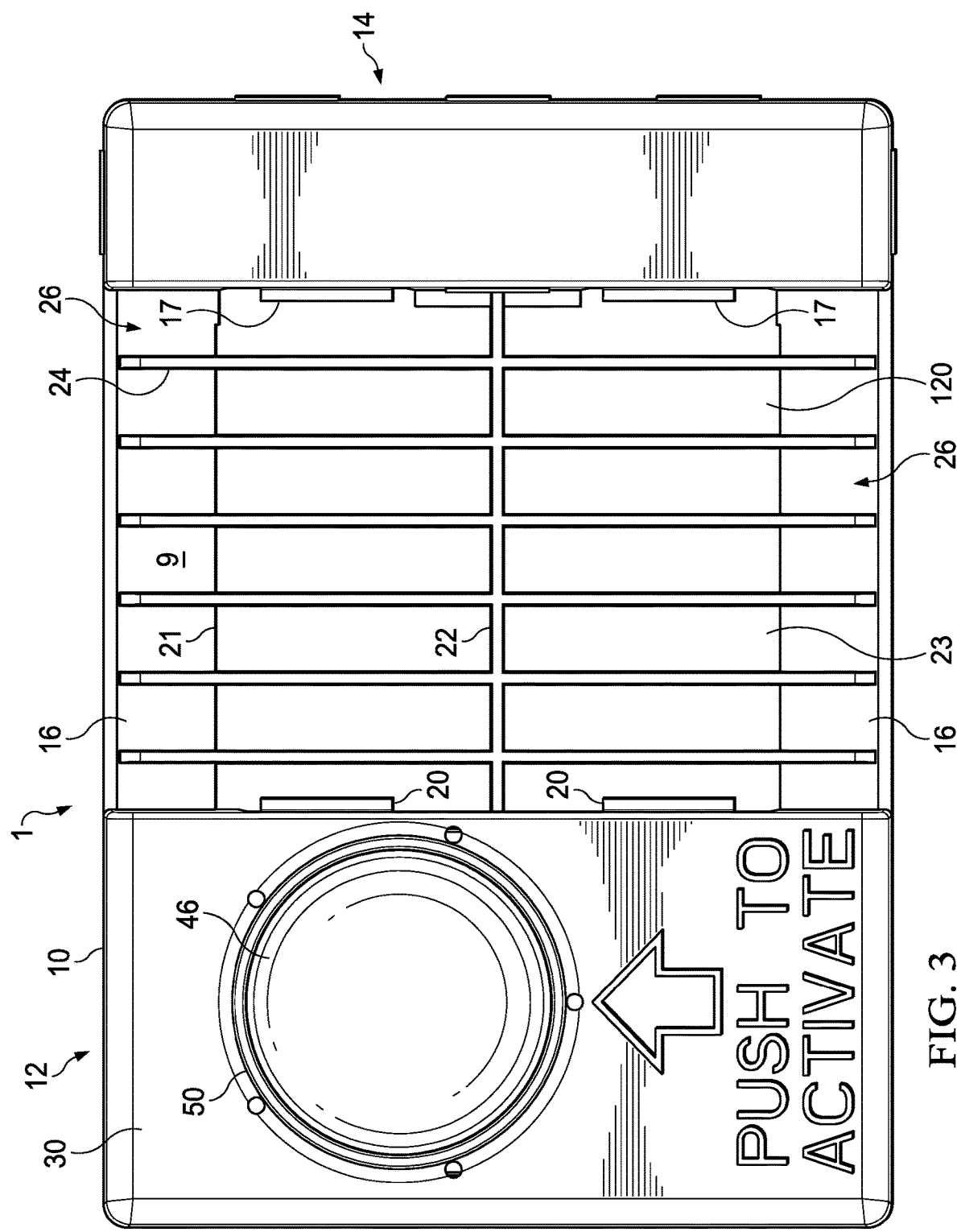
FIG. 3 is a top plan view of the trap of FIG. 1, wherein the second housing has been removed for illustration purposes.

FIG. 3 shows the first housing 10 with the second housing 60 removed. The first housing 10 may include a first portion 12, a second portion 14 spaced apart from the first portion, a bottom wall 16 connecting the first and second portions 12, 14, a space 18 disposed between the first and second portions 12, 14, and a longitudinal chamber member 22 also connecting the first and second portions 12, 14. In some embodiments, the first portion 12 may include a first vertical wall 34a, second vertical wall 34b connected to the first vertical wall, a third vertical wall 34c connected to the second vertical wall, and a fourth vertical wall 34d connected between the first and third vertical walls. All four vertical walls 34a-d may extend upward from the bottom wall 16 to at least partially form or define the reservoir 40 disposed therein.

The first portion 12 may also include an upper housing 30 that that is configured to slide over the top of, and at least partially enclose, the four vertical walls 34a-d therein. In such a configuration, the reservoir 40 is completely disposed within or enclosed by the first portion 12 of the first housing 10 and the upper housing 30. The reservoir 40 may be configured to receive and hold an attractant 150 therein. As will be described in greater detail below herein, in some embodiments, the attractant 150 may include an attractant composition, a first package 152 enclosing the attractant composition, and a second package 154 enclosing the first package 152.

The upper housing 30 may include a first upper housing wall 38a, a second upper housing wall 38b connected to the first upper housing wall, a third upper housing wall 38c connected to the second upper housing wall, and a fourth upper housing wall 38d connected between the first and third upper housing walls. The upper housing 30 further includes the actuator 44 that forms a top wall of the upper housing that may be connected to upper ends of the four upper housing walls 38a-d. In some embodiments, when the upper housing 30 is placed over and slid down over the first portion 12 of the first housing 10, the four vertical walls 34a-d of the first housing 10 are disposed and enclosed within the respective four upper housing walls 38a-d as shown, for example, in FIGS. 2 and 10-13. The third upper housing wall 38c may include one or more upper housing tabs 20 extending outward from the third upper housing wall 38c toward the space 18. The four vertical walls 34a-d and the four upper housing walls 38a-d may have any length and height.

Figure 2:
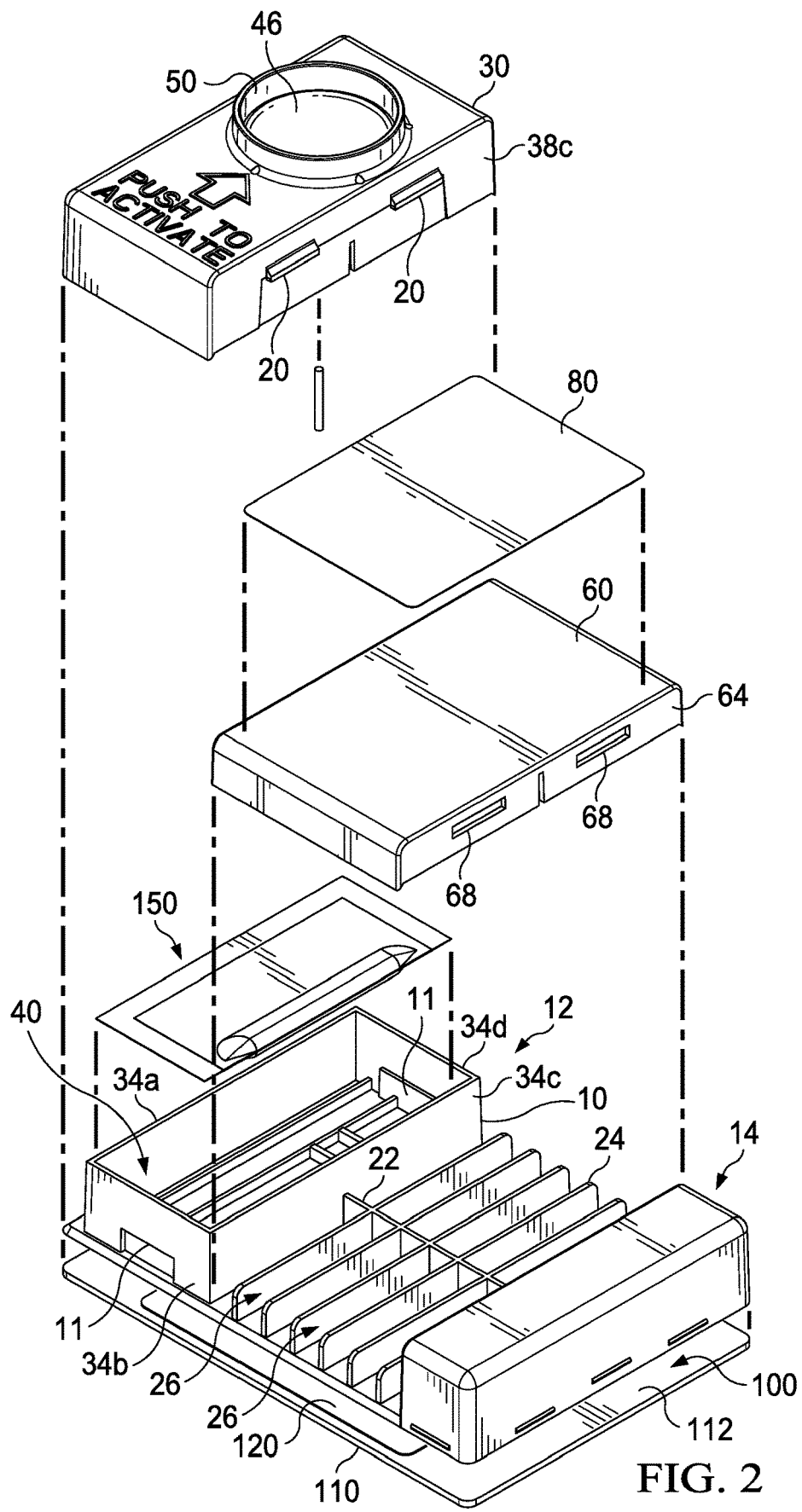
FIG. 2 is an exploded view of the trap in FIG. 1.

In some embodiments, the upper housing 30 may be removably or fixedly connected to the first portion 12 of the first housing 10. Illustrative connections may include adhesive, bolt/nut connections, screw connections, rivet connections, welds, tongue and groove connections, snap-fit connections such as, for example, tab and detent connections, and other similar type connections. As shown in FIGS. 2, 12, and 13, in one embodiment, first housing 10 may include detents 11 disposed on second vertical wall 34b and fourth vertical wall 34d, and the upper housing 30 may include tabs 13 extending inward from second upper housing wall 38b and fourth upper housing wall 38d, which are configured to engage the respective detents 11 in the first housing 10, connecting the upper housing 30 to the first housing 10.

In some embodiments, the actuator 44 may include a button 46, a protrusion holder 48 disposed on an underside of the button 46 and configured to hold and/or connect to the protrusion 42 such that the protrusion extends inward into the reservoir 40. In some embodiments, the protrusion 42 may be configured to pierce a package such as, for example, one or more package walls, substrates, and/or layers of the attractant 150. As shown, for example, the protrusion 42 is an elongated member (e.g., a rod) extending from the button 46. The protrusion 42 may comprise a variety of shapes, materials, and configurations, including metal and/or plastic. The protrusion 42 may be separately connectable to the protrusion holder 48 or be fabricated from such that the protrusion 42 has a unitary, monolithic construction with the button 46 and/or the protrusion holder 48. As such, in some embodiments, the protrusion 42 may be fabricated from the same material (e.g., polypropylene) as the button 46 and/or the protrusion holder 48. In some embodiments, the protrusion 42 may be a pin. In some embodiments, the protrusion 42 may be configured to include a tip that is pointed or sharp.

The actuator 44 may also include a guard 50 that extends upward away from the first housing 10. The guard 50 may surround the button 46 and include an opening 52 configured to permit a user to push on the button 46 through the opening 52 to actuate the button 46. In some embodiments the guard 50 may be configured to protect the button 46 from accidental activation.

Figure 16:
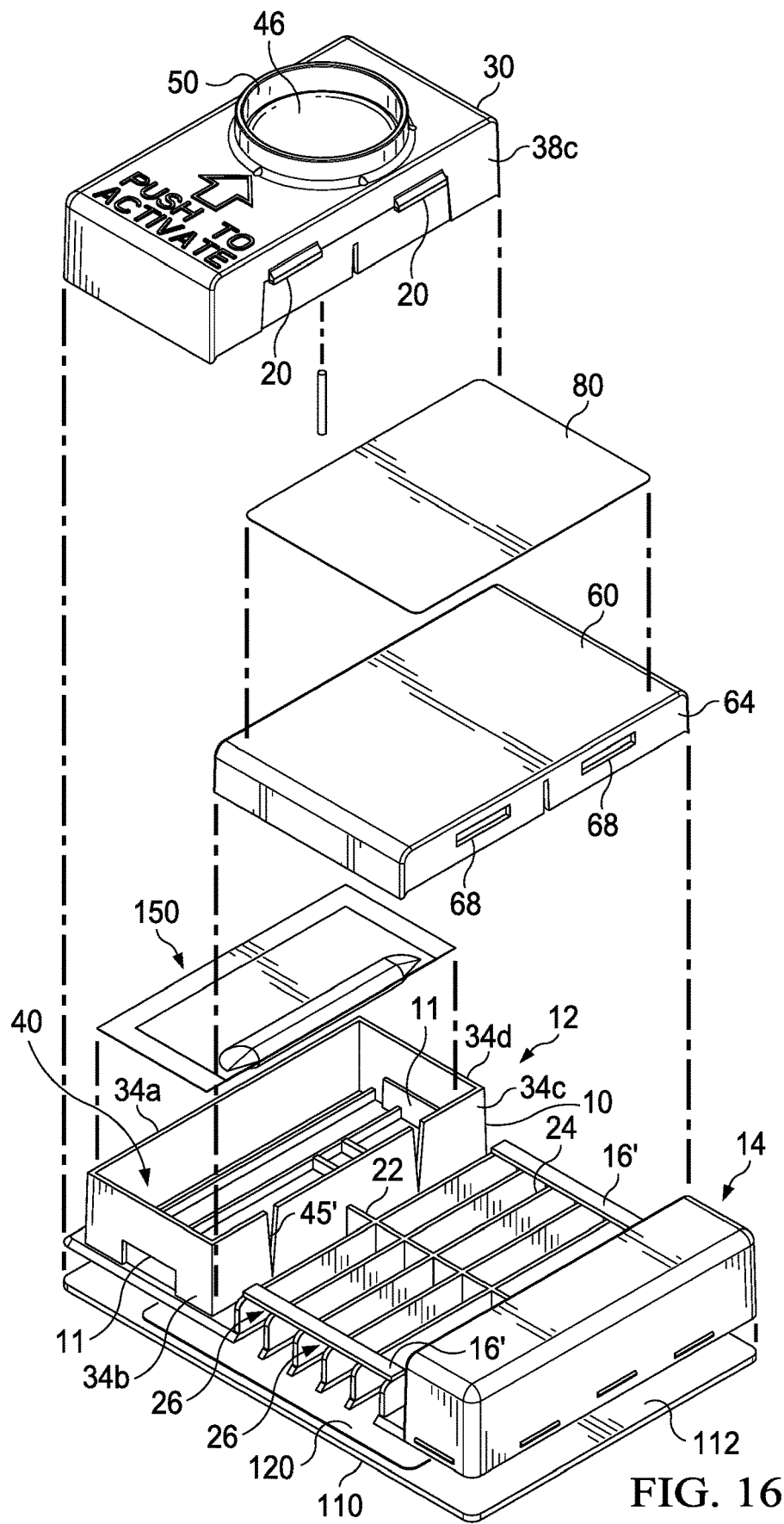
FIG. 16 is an exploded view of an insect trap according to one or more embodiments.

The actuator 44 and/or button 46 may be fabricated from a material that is resilient such that when a user applies a force to (e.g., pushes) the button 46 inward toward the reservoir 40, the button moves, bends, or flexes inward toward the reservoir. In some embodiments, actuator 44 and/or button 46 may be fabricated from a material that has memory such that when a user applies a force to (e.g., pushes) the button 46 inward toward the reservoir 40, the button moves, bends, or flexes inward toward the reservoir, causing the protrusion 42 to move linearly inward along a vertical axis (e.g., a downward direction) as illustrated by arrow A, ultimately piercing and/or puncturing a package (e.g., second package 154 of attractant 150) disposed within the reservoir 40. In some embodiments, the button 46 has a convex curvature or arch. Thus, when the button 46 is pushed inward toward the reservoir 40, the button flexes inward or, in other words, the convex curvature collapses inward toward the reservoir 40 as described. Once the force is removed from the button 46, the button 46 may return to its original shape and/or position (e.g., normal position) due to the material's memory. This movement back to the button's normal position may also move the protrusion 42 back upward along the vertical axis out of and/or clear of any package disposed within the reservoir 40 (e.g., second package 154 of the attractant 150). For example, the protrusion 42 is moved out of the puncture hole created by the protrusion in the second package 154 held within the reservoir 40. To assist with the flexing and/or bending, in some embodiments, the actuator 44 and/or button 46 may include at least one area of flexibility or weakened areas 45. In some embodiments, the weakened areas 45 may act as vents. Additionally, in some embodiments, weakened areas 45' may be disposed in a wall of the first housing 10, such as, for example, the third vertical wall 34c as shown in FIG. 16.

The second portion 14 of the first housing 10 may include a second portion wall 15. The second portion wall 15 may include one or more second portion tabs 17 extending outward therefrom toward the space 18. The space 18 may be defined between the third upper housing wall 38c of the upper housing 30 and the second portion wall 15 of the second portion 14.

Figure 9:
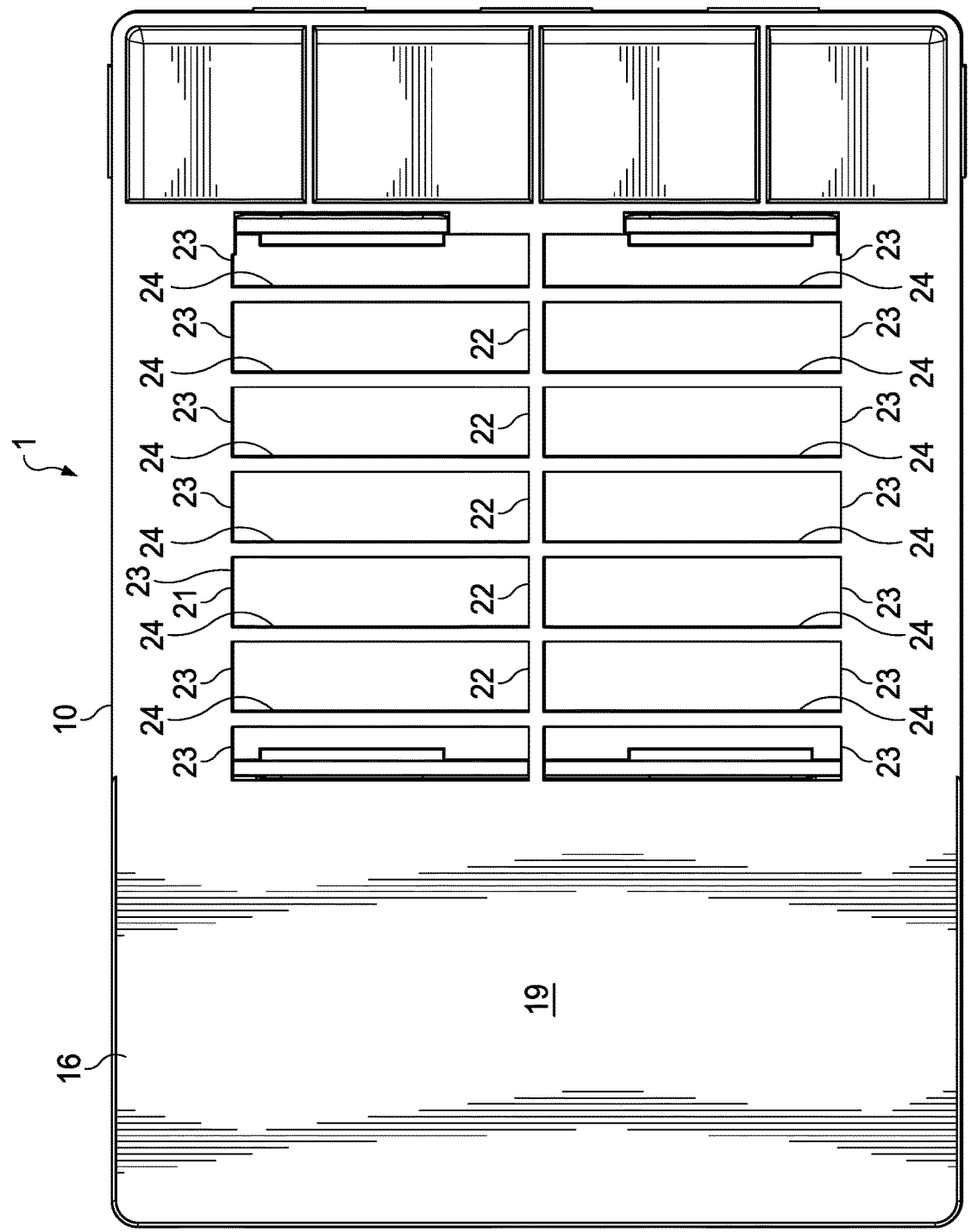
FIG. 9 is a bottom plan view of the trap of FIG. 1, wherein a substrate has been removed from a bottom wall of a first housing.
Figure 10:
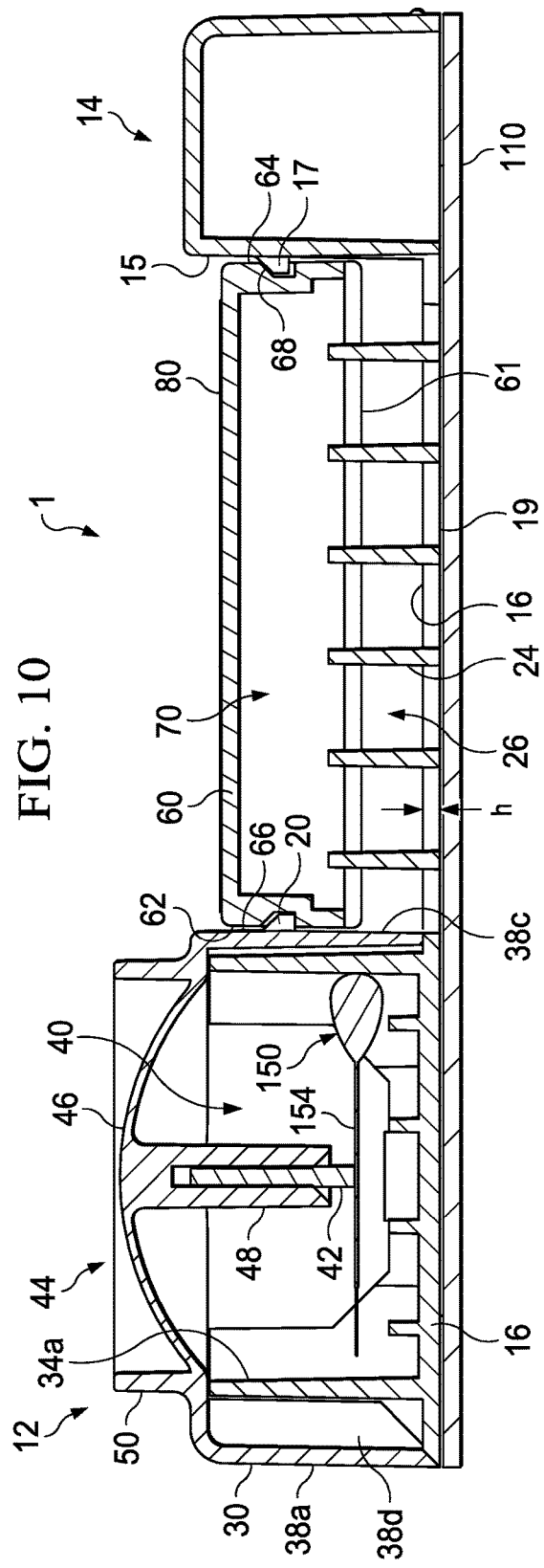
FIG. 10 is a cross sectional side view of the trap of FIG. 1 taken at lines 10-10.
Figure 11:
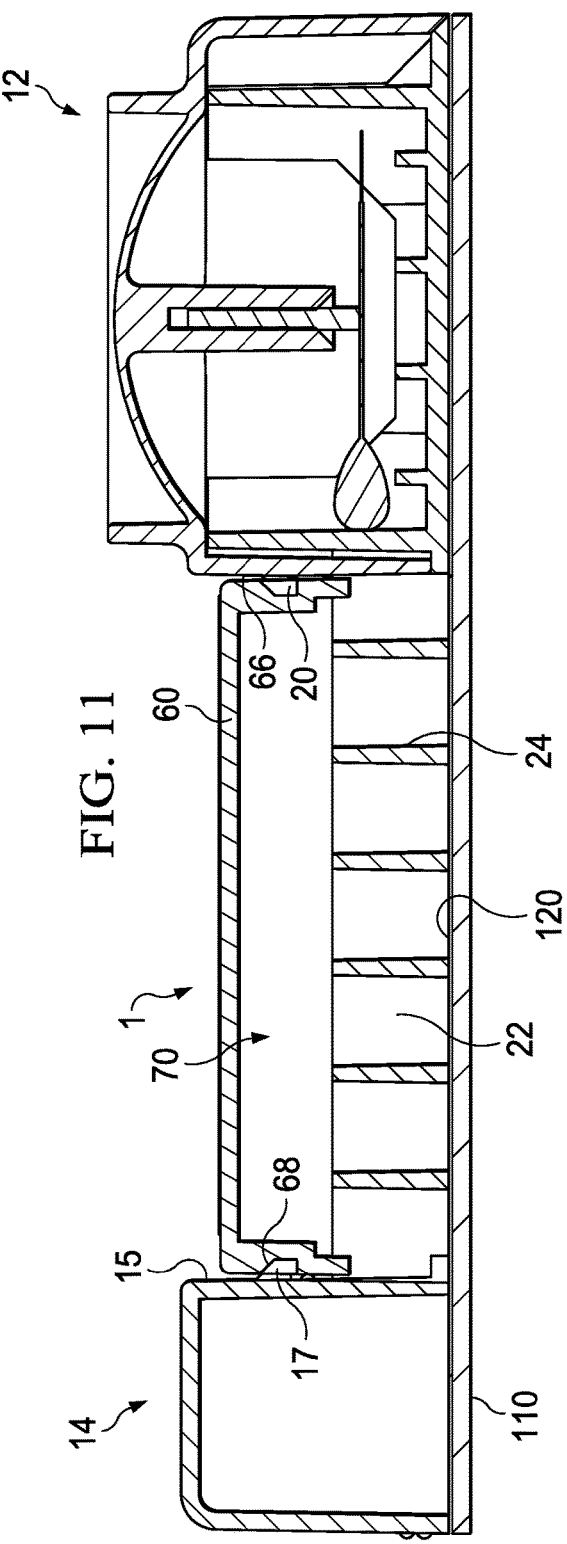
FIG. 11 is a cross sectional side view of the trap of FIG. 1 taken at lines 11-11.

As shown in FIGS. 2, 9, and 11 the longitudinal chamber member 22 may be disposed in the trap chamber 70 (and/or the space 18) and extend upward into the trap chamber to form a wall disposed within the chamber along the longitudinal axis L-L'. The longitudinal chamber member 22 may have any length and height. Also, a plurality of interior channel walls 24 extend perpendicularly from the longitudinal chamber member 22 to form a plurality of channels 26 disposed between each set of adjacent interior channel walls, between the third upper housing wall 38c and one of the plurality of interior channel walls 24, and between the second portion wall 15 and one of the plurality of interior channel walls 24. The plurality of interior channel walls 24 may have any length and height. The plurality of channels 26 forms a plurality of sub-chambers within the trap chamber 70. Referring to FIG. 3 (a top view of the trap 1 with the second housing 60 removed for illustration purposes only), the bottom wall 16 may include a trap chamber aperture 21 disposed there through and sized to match or substantially match the length and width dimensions of the trap chamber 70. The longitudinal chamber member 22 and the plurality of interior chamber walls 24 divide the trap chamber aperture 21 into a plurality of sub-chamber apertures 23 that vertically align with each of the sub-chambers or channels 26 as best shown in FIGS. 3, 9, 10, and 11.

The first housing 10, and one or more of its components, may be fabricated as a unitary, monolithic component. In some embodiments, the first housing, and one or more of its components, may be fabricated as multiple components that may be connected (e.g., fixedly or removably) to each other, using any connection method described herein and/or any other conventional or yet-to-be developed connections and/or connection techniques. As shown in the figures, all of the first housing 10 may be fabricated as a unitary, monolithic component, except for the upper housing 30 of the first housing 10, which may be connected to the first portion 12 of the first housing as set forth above herein. In some embodiments, the first housing 10 is molded from plastics such as, for example, polypropylene, polyethylene, elastomer, copolymer, impact modified copolymer, polystyrene, combinations thereof, or the like, using conventional plastic molding techniques such as, for example, injection molding, blow molding, compression molding, extrusion molding, laminating, reaction injection molding, matrix molding, rotational molding (or rotomolding), 3D printing, combinations thereof, or the like. The first housing 10 and/or its features and components may comprise any number of configurations, sizes, shapes, components, designs, and/or other materials (e.g., composites, metals, etc.).

The second housing 60 may include a first wall 62, a second wall 64 opposite the first wall, and a bottom edge 61 along both the first and second walls 62, 64. The first wall 62 may include one or more detents (e.g., first wall detents 66 disposed within an outer surface of the first wall 62 as shown in FIGS. 10 and 11). Similarly, the second wall 64 may include one or more detents (e.g., second wall detents 68 disposed within an outer surface of the second wall 64 as shown in FIGS. 2, 10, and 11). As shown, the second housing 60 may be inserted into the space 18 between the first portion 12 and second portion 14 of the first housing 10 such that upper housing tabs 20 engage respective first wall detents 66 on the first wall 62 of the second housing 60 and second portion tabs 17 engage respective second wall detents 68 on the second wall 64 of the second housing 60. Such engagement of the tabs 20, 17 of the first housing 10 with the respective detents 66, 68 of the second housing may hold the second housing in the first position (as shown in FIGS. 1, 4, 5, 10, and 11) connected to the first housing 10 within the space 18 as set forth above herein, forming and/or defining at least a portion of the trap chamber 70 (shown in FIGS. 10 and 11). The inlet 72 is defined between the bottom edge 61 of the second housing 60 and the bottom wall 16 of the first housing 10 as shown in FIGS. 1, 4, 5, and 10. In some embodiments, a portion of the wall 16 is positioned above the inlet 72. For example, as shown in FIG. 16, a portion of the wall 16' is at a higher vertical elevation than the inlet 72 into the trap chamber. Thus, the inlet 72 may be defined between a bottom edge of the wall 16' and the floor 100.

The second housing 60, and one or more of its components, may be fabricated as a unitary, monolithic component. In some embodiments, the second housing, and one or more of its components, may be fabricated as multiple components that may be connected (e.g., fixedly or removably) to each other, using any connection method described herein and/or any other conventional or yet-to-be developed connections and/or connection techniques. As shown in the figures, all of the second housing 60 may be fabricated as a unitary, monolithic component, which may be moveably connected to the first portion 12 and second portion 14 of the first housing 10 as set forth above herein. In some embodiments a portion or all of the second housing 60 is transparent and/or translucent to permit a user to view through the transparent or translucent portion of the second housing 60 into the trap chamber 70. In some embodiments, the first housing 10 is molded from plastics such as, for example, polypropylene, polyethylene, elastomer, copolymer, impact modified copolymer, polystyrene, combinations thereof, or the like, using conventional molding techniques such as, for example, injection molding, blow molding, compression molding, extrusion molding, laminating, reaction injection molding, matrix molding, rotational molding (or rotomolding), 3D printing, combinations thereof, or the like. The second housing 60 and/or its features and components may comprise any number of configurations, sizes, shapes, components, designs, and/or other materials (e.g., composites, metals, etc.).

Figure 4:
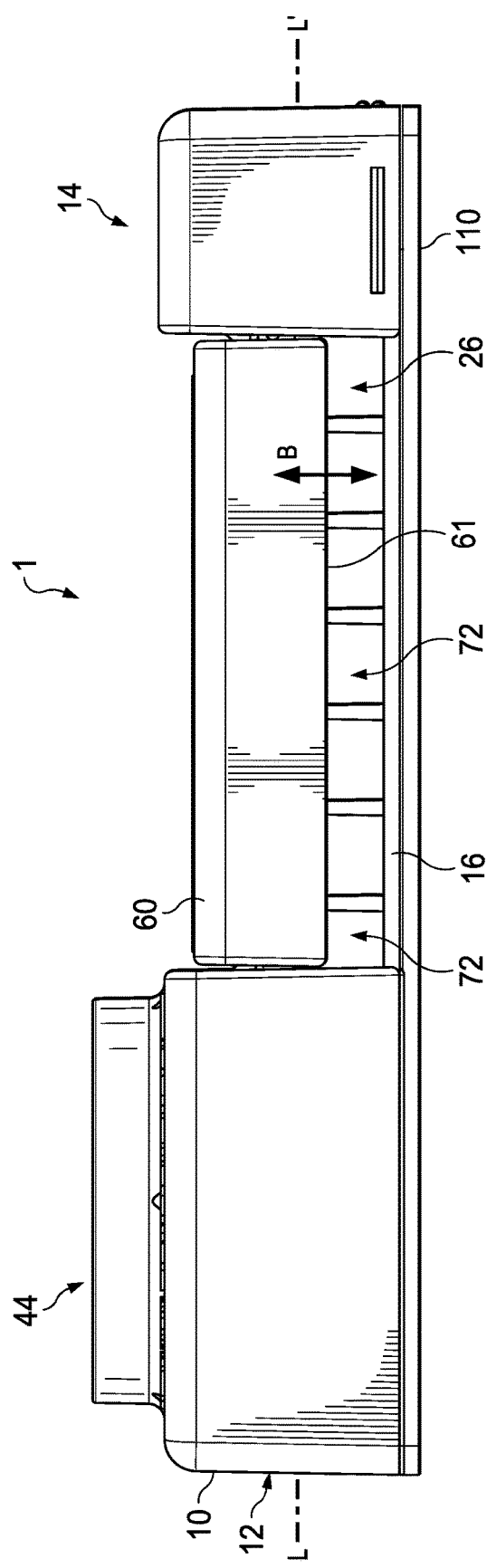
FIG. 4 is a front elevational view of the trap of FIG. 1.
Figure 5:
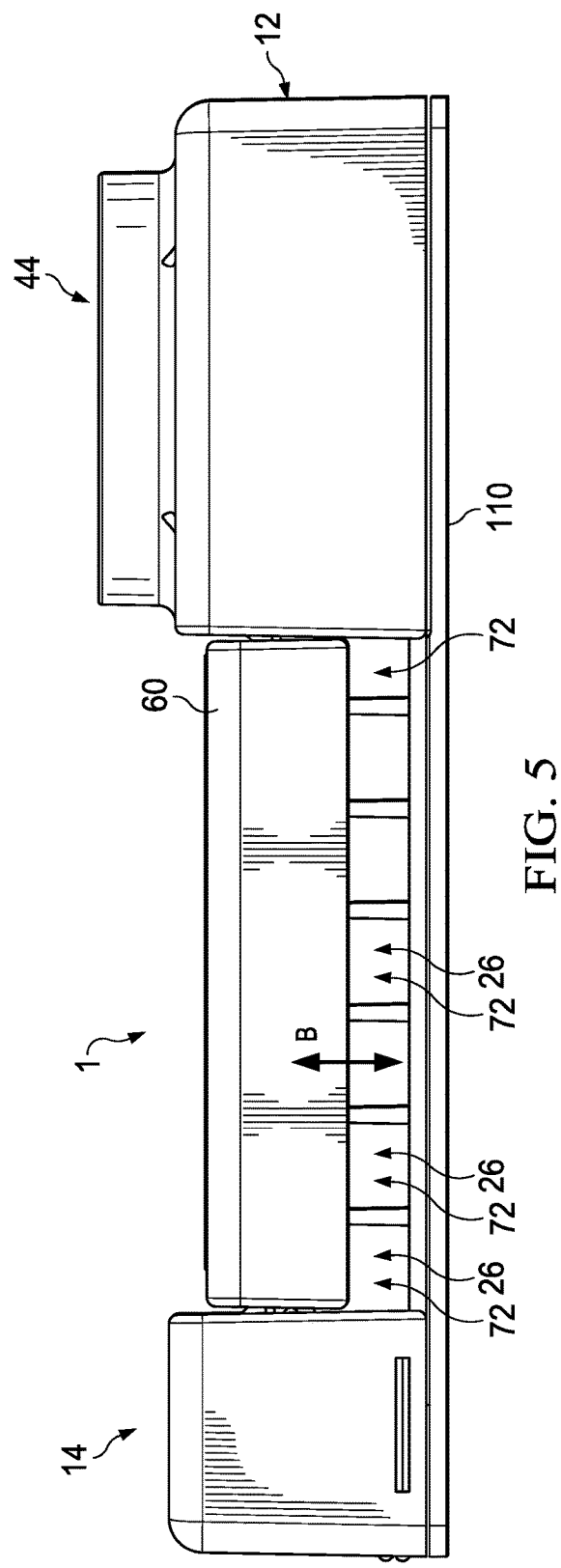
FIG. 5 is a back elevational view of the trap of FIG. 1.
Figure 6:
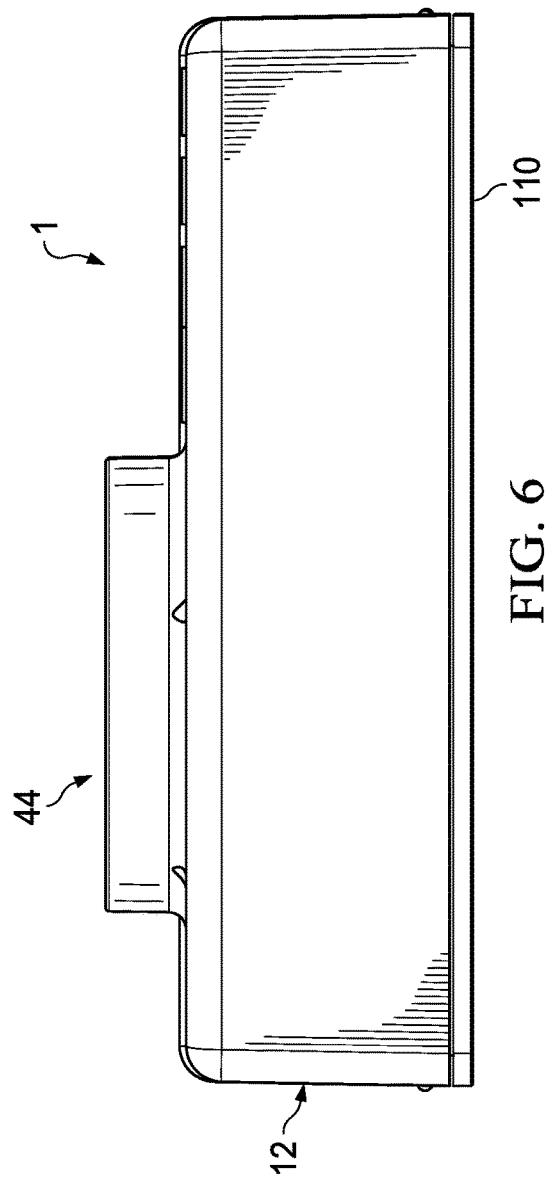
FIG. 6 is a left side elevational view of the trap of FIG. 1
Figure 7:
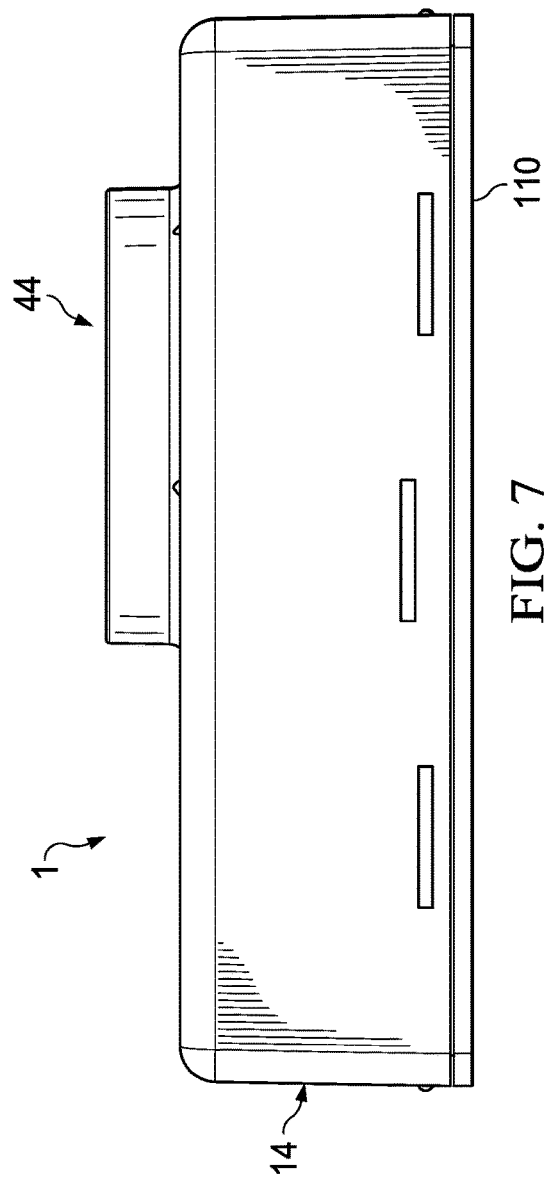
FIG. 7 is a right side elevational view of the trap of FIG. 1.
Figure 8:
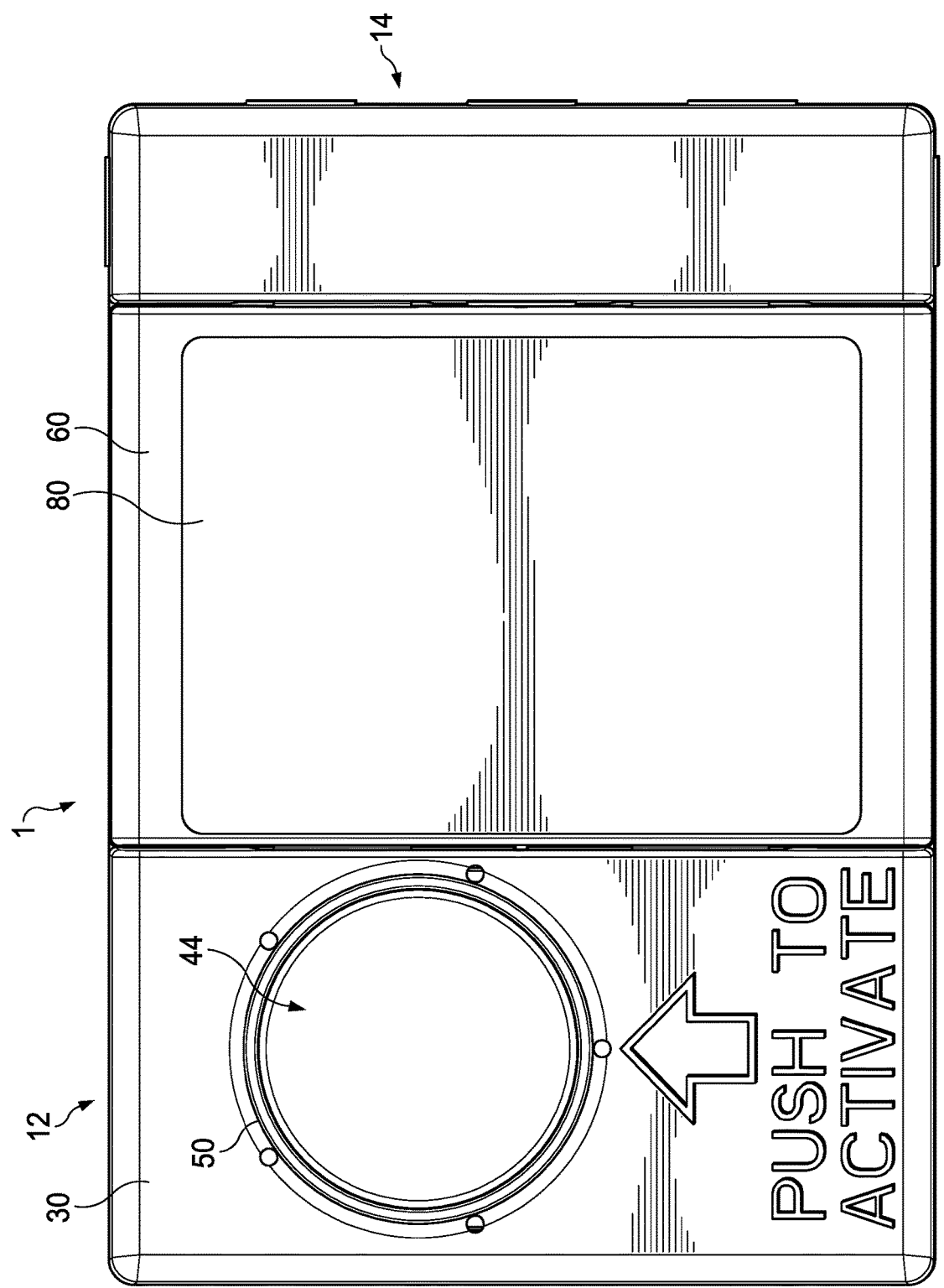
FIG. 8 is a top plan view of the trap of FIG. 1.

If a user places a force on (e.g., pushes on) the second housing 60 toward the first housing 10 (e.g., downwardly or inward toward the reservoir 70 as indicated by arrow B in FIGS. 4 and 5), the tabs 17, 20 of the first housing 10 disengage and move out of the respective detents 66, 68 of the second housing, permitting the second housing 60 to move from the first position (e.g., FIGS. 1, 4, and 5) to the second position (e.g., FIG. 14), closing the inlet 72 and trapping any insect(s) that is within the trap chamber 70 as set forth above herein. This engagement between the first and second housings permits a movable or slideable engagement between the housings, which allows one or more insects to enter the trap chamber and then a user to trap and prevent the one or more insects from exiting the trap 1. It is understood that first and second housings may be engaged and/or moveably engaged with each other in any number of configurations and designs, including but not limited to, tongue and groove, tab and slide channel, hinged connected, pivoted connection, or rotational connection (e.g., dial connection).

In the embodiment shown, the floor 100 of the trap chamber 70 is formed by a substrate 110. An adhesive 120 may coat a portion or all of a surface (e.g., upper surface 112) of the substrate 110. In some embodiments, more than one surface may be partially or completely coated with an adhesive. The substrate 110 is adhered via adhesive 120 to a bottom surface 19 of the bottom wall 16 of the first housing 10 opposite the trap chamber 70. When connected as such to the first housing, the substrate 110 places and thus provides an adhesive coated substrate as the floor 100 in each of the channels 26 and thus the trap chamber 70. The substrate 110 may include, temporarily, a protective substrate (e.g., wax paper) that is removably connected to the substrate via the adhesive 120 to cover and protect the adhesive. In some embodiments, the substrate 110 includes a commercially available glue card. The substrate 110 may be unconnected from the first housing 10 and then, after purchase, a user may peel off the protective sheet and adhere the substrate 110 to the first housing 10 as described above herein.

As shown in FIG. 10, the bottom wall 16 may comprise a thickness (h). In some embodiments, when the substrate 110 is connected to the bottom surface 19 of the bottom wall 16, the adhesive 120 may be configured to enter the plurality of sub-chamber apertures 23 such that the adhesive is at the same or substantially the same vertical elevation as the top surface of the bottom wall 16. In such embodiments, the thickness of the adhesive 120 is equal to or greater than (h). Accordingly, one or more insects, being lured by the attractant (e.g., one or more attractants) disposed in the reservoir 40, may enter the trap chamber 70 via the inlet 72 and eventually crawl onto the adhesive, trapping the one or more insects within the trap chamber 70.

In some embodiments, the adhesive 120 may be configured to not enter or only partially enter the plurality of sub-chamber apertures 23 such that the adhesive is below the vertical elevation of the top surface of the bottom wall 16. In such embodiments, the thickness of the adhesive 120 is less than (h), which creates a "pit" that the insects may fall into as they enter the trap 1 via the inlet 72. Accordingly, one or more insects, being lured by the attractant (e.g., one or more attractants) disposed in the reservoir 40, may enter the trap chamber 70 via the inlet 72 and eventually crawl and fall into one of the sub-chamber apertures. In such an embodiment, the one or more insects may not only be trapped by the pit created by this design, but the adhesive as well.

The same applies to the embodiments, wherein the bottom wall 16, rather than a substrate 110, comprises the floor 100 of the trap chamber 70. In some embodiments, the floor 100 (i.e., the bottom wall 16 within the trap chamber 70) may be at the same vertical elevation as the bottom wall at the inlet 72 into the trap chamber or at some vertical elevation below the bottom wall at the inlet 72 into the trap chamber. Similarly, these embodiments may or may not include adhesive. If they include adhesive, these embodiments may be configured such that the adhesive's upper surface is at a vertical elevation below, the same, or above the vertical elevation of an upper surface 9 of the bottom wall 16 at the inlet into the trap chamber. Accordingly, one or more insects, being lured by the attractant (e.g., one or more attractants) disposed in the reservoir 40, may enter the trap chamber 70 via the inlet 72 and eventually crawl toward and get captured in the adhesive and/or fall into a pit created by the portion of bottom wall 16 that is at a lower vertical elevation, i.e., a pit. In such an embodiment, the one or more insects may be trapped by adhesive alone, the pit alone, or a combination of both.

Figure 15:
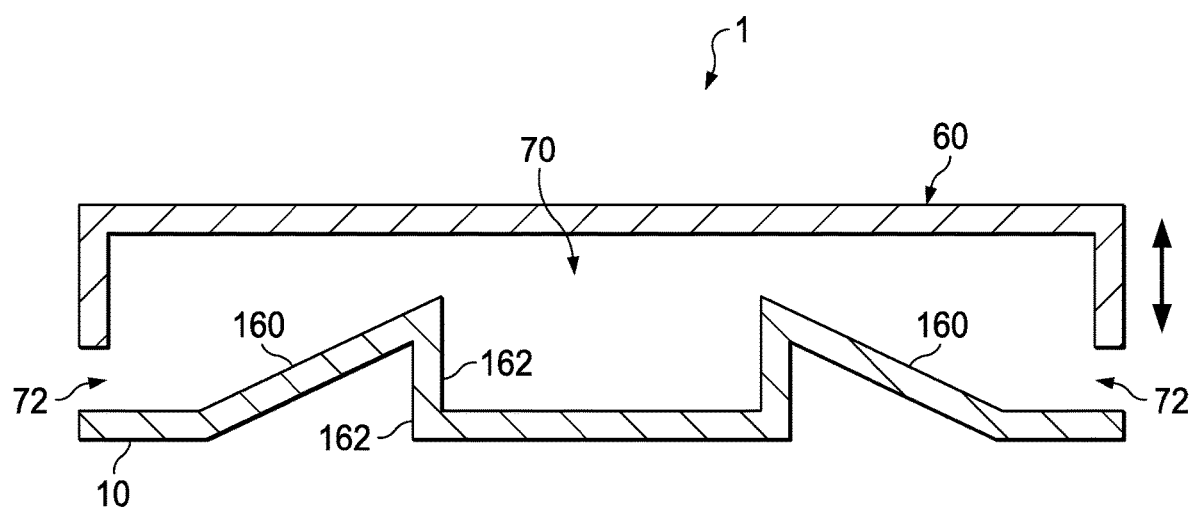
FIG. 15 is a cross sectional side view of another embodiment of the trap of FIG. 1.

Referring to FIG. 15, as an example, another embodiment of trap 1 is partially shown. It is understood that this trap may include one or more of the components and/or features of the embodiments of trap 1 shown and described above herein. As shown, trap 1 may include the first housing 10, the second housing 60 moveably engaged to the first housing, the trap chamber 70 defined by the first and second housings, and the inlet 72 providing a passage into the trap chamber 70 as shown and described herein. However, in this embodiment, the first housing includes one or more upward sloped portions 160, creating a pit 162, within the trap chamber 70. As one or more insects enter the trap chamber 70, the one or more insects may progress up the sloped portion 160 until the one or more insects reaches the peak 164 and then the one or more insects may fall into the pit 162. In some embodiments, the pit 162 may also include an adhesive on one or more of its wall (e.g., bottom wall), providing an additional method of trapping the insect over-and-above the pit.

In some embodiments, the trap may include insect retention mechanisms in addition to or in place of the adhesive (e.g., adhesive 120) and/or pit (e.g., pit 162) to capture and/or arrest insects. These insect retention mechanisms may be used with the attractants herein. Illustrative insect retention mechanisms that may be included in one or more embodiments of the trap herein include, but are not limited to, histamine, diatomaceous earth, amorphous silica, biological control agents (e.g., pathogenic fungi), chemical toxin/insecticide, combinations thereof, and/or the like. In one example, the pit 162 or trap chamber floor 100 may include diatomaceous earth disposed therein. In another example, the pit 162 or trap chamber floor 100 may include amorphous silica. In another example, the pit 162 or trap chamber floor 100 may include a chemical toxin/insecticide. Other examples may include any combination of these retention mechanisms or similar ones. The diatomaceous earth and/or amorphous silica may injure and/or desiccate the insects such as, for example, bed bugs, and thus reduce the chance of the insects exiting the trap. In some embodiments, the trap may include histamine(s) disposed along (e.g., coated, sprayed, etc.), within, and/or impregnated within the first housing 10, second housing 60, the trap chamber 70, and/or a cellulose surface. The histamine may also be disposed upon or incorporated into the adhesive. For example, a cellulose-based substrate (e.g., a "matt") may be impregnated with histamine. The histamine-impregnated substrate may be placed on the floor 100 of the trap chamber or in the pit 162 of the trap chamber. Histamine may be used alone or in combination with the adhesive, pits, and/or the other insect retention mechanisms, and/or the attractants herein. It is understood that the other components of the trap (e.g., floor 100) may be impregnated with histamine.

In some embodiments, the trap 1, the first housing 10, and/or the substrate 110 may include loop and hook and/or other mechanisms configured to connect (e.g., fixedly or removably) the trap to a bed, bed linens, carpet, and/or other materials. In some embodiments, the trap 1 (e.g., the first housing 10) may be configured to comprise a dark color to attract insects such as, for example, red or black. In some embodiments, the color only has to appear dark to the insect you are trying to attract, capture, and/or arrest. For example, the color red appears dark to a bed bug. In some embodiments, one or more outer surfaces of the trap 1 (e.g., outer surfaces of the first housing 10 and/or the second housing 60) are configured to be smooth (e.g., very smooth) to discourage insects from staying on the outer surfaces of the trap. In some of these embodiments, this smooth or very smooth outer surface(s) may increase the likelihood of the insects entering the trap. The material for the housings may be selected and/or fabricated to provide one or more of the trap's outer surfaces with a smooth or very smooth surface. In some embodiments, one or more of the trap's outer surfaces, trap chamber's surfaces, and/or pit's surfaces may be coated with a material that provides a smooth or very smooth surface.

In some embodiments, the floor 100 and/or the upper surface 9 of the bottom wall 16 (e.g., at the inlet 72) may be configured to provide the insects grip (e.g., optimal or greater grip) which may encourage the insects to enter the trap 1. In some embodiments, the floor 100 and/or the upper surface 9 may include a plurality of cilia extending from such surface(s) to provide a grip (e.g., optimal grip) for insects entering the trap. It is understood that other mechanisms may be used to improve the grip of the insects on such surfaces such as, for example, low durometer materials, etc.

In some embodiments, a kit for an insect trap may include one or more of the features of the traps shown and described herein in assembled, partially assembled, or unassembled configurations. For example, a kit for an insect trap 1 may include a first housing including a first surface, a reservoir disposed within the first housing, a protrusion disposed within the reservoir and extending inward from an interior surface of the first housing, and an actuator disposed upon an exterior surface of the first housing and connected to the protrusion such that when the actuator is moved, the protrusion moves within the reservoir; a second housing moveably engaging the first housing; an attractant 150 configured to attract insects and to be disposed within the reservoir; a substrate comprising an adhesive disposed upon at least a portion of a surface of the substrate, the substrate configured to adhere to the first surface of the first housing; a trap chamber formed by the first housing, second housing, and substrate when the substrate is adhered to the first surface of the first housing; and an inlet providing a passage into the trap chamber; wherein the second housing is movable between a first position where the inlet is open and a second position where the inlet is closed. In some embodiments, the kit may include one or more of the mechanisms shown and described herein to capture and/or arrest the insects that enter the trap. The attractant will be described below herein.

In some embodiments, the floor 100 of the trap chamber 70 is formed by the bottom wall 16 of the first housing. In such embodiments, the bottom wall 16 does not include the trap chamber aperture 21 and thus does not include the plurality of sub-chamber apertures 23. An adhesive (not shown) may coat a portion or all of a surface (e.g., the upper surface 9, opposite bottom surface 19, of the first housing 10) of the substrate 110. In some embodiments, more than one surface of the first housing 10 may be partially or completely coated with an adhesive.

The trap 1 may include an attractant 150 partially or completely disposed within the reservoir 70. In some embodiments, the attractant 150 comprises an attractant composition configured to attract or lure insects, including but not limited to bed bugs, bat bugs, swallow bugs, poultry bugs, and Hesperocimex *coloradensis*, the first package (or inner package) 152 enclosing the attractant composition therein, and the second package (or outer package) 154 enclosing the inner package 152, and thus the attractant composition, therein.

In some embodiments, the attractant composition comprises a pheromone composition of one or more pheromone components and/or one or more other ingredients (e.g., a pheromone blend) as shown and described in PCT/CA2014/051218, filed Dec. 16, 2104, which is incorporated herein by reference.

Some aspects of the invention pertain to compositions for attracting and/or arresting bed bugs, such as the common bed bug, *Cimex lectularius*, and the tropical bed bug, *C. hemipterus*. In some embodiments, the composition may comprise pheromone components isolated from the exuviae or faeces of the bed bug *Cimex lectularius*, or synthetic equivalents of such compounds. In some embodiments the composition comprises histamine. In some embodiments the active ingredient of the composition may essentially consist of histamine. In some embodiments, histamine is provided as a base. In some embodiments the composition comprises histamine and a blend of volatile compounds comprising sulfides, aldehydes and ketones. In some embodiments the blend of volatile compounds comprises one or more of dimethyl disulfide, dimethyl trisulfide, (E)-2-hexenal, (E)-2-octenal, and 2-hexanone. In some embodiments the active ingredients of the composition may essentially consist of histamine and one or more of dimethyl disulfide, dimethyl trisulfide, (E)-2-hexenal, (E)-2-octenal, and 2-hexanone. In some embodiments the composition may comprise or essentially consist of histamine, dimethyl disulfide, dimethyl trisulfide, (E)-2-hexenal, (E)-2-octenal, and 2-hexanone.

In some embodiments the compositions described herein may include one or more additional active ingredients such as butanal, pentanal, hexanal, benzaldehyde, benzyl alcohol, acetophenone, verbenone, ethyl octanoate, methyl octanoate, pentyl hexanoate, dimethylaminoethanol, N-acetylglucosamine, 3-hydroxykynurenine O-sulfate, L-valine, L-alanine, octanal, nonanal, decanal, (E,E)-2,4-octadienal, (E,Z)-2,4-octadienal, benzyl acetate, (+)-limonene, (−)-limonene, 6-methyl-5-hepten-2-one (sulcatone), geranylacetone, carbon dioxide, 1-octen-3-ol, L-carvone, L-lactic acid, propionic acid, butyric acid, valeric acid, oleic acid, palmitic acid, stearic acid, linoleic acid, lauric acid, capric acid, myristic acid, androstenone, 3-methyl indole, 1-docosanol, pentadecanoic acid, squalene, cholesterol, and 2,2-dimethyl-1,3-dioxolane-4-methanol.

In some embodiments, the compositions described herein may be formulated as a granule, powder, dust, paste, gel, suspension, emulsion or liquid solution.

Certain aspects of the invention pertain to methods for attracting and/or arresting bed bugs, such as the common bed bug, *Cimex lectularius*, and the tropical bed bug, *C. hemipterus*, in a desired location. In some embodiments the methods comprise providing a composition as described herein at the desired location. In some embodiments the desired location can be in, on or near a bed bug control device which is located in any structure occupied by a human or animal, such as one or more buildings, vehicles, dwellings and/or living spaces in a residential, institutional, commercial, industrial, governmental, or agricultural setting, in which bed bugs were present, are present or are suspected to be present. In some embodiments the suitable bed bug control devices include detectors, monitors and traps.

In some embodiments the compositions may be formulated as a lure, such as a slow release lure, and provided in, on or near a bed bug control device. In some embodiments the compositions may be provided in a slow release device provided in, on or near a bed bug control device. In some embodiments, certain components of the composition may be provided in separate slow release devices and/or other release devices (e.g., normal or standard release). For example, in some embodiments the deployment mechanism for histamine may be an absorbent material (e.g., an absorbent mat such as a cellulose or cellulose-based substrate (e.g., mat)) impregnated with histamine, and the slow release device for the volatile compounds as described herein or the volatile compounds and the one or more additional compounds as described herein, may be a gas-permeable sealed reservoir (e.g., a pheromone-permeable, sealed plastic reservoir). In some embodiments the components of the composition may be provided in the same slow release device.

In some embodiments the compositions may be combined with a source of heat, carbon dioxide and/or a pesticide that is lethal to bed bugs. As set forth above, in some embodiments, the pesticides may be diatomaceous earth, amorphous silica, biological control agents (e.g., pathogenic fungi), or the like.

Certain aspects of the invention pertain to the uses of compounds and compositions for attracting and/or arresting bed bugs. In some embodiments, histamine may be used to arrest bed bugs. In some embodiments, the compositions as described herein are used to attract and/or arrest bed bugs.

In some embodiments, the second package 154 encloses the first package 152 and is configured to prevent one or more ingredients of the attractant composition and gas such as, for example, an active ingredient, from evaporating by volatizing through a wall of the first package 152 and a wall of the second package 154. In some embodiments, the second package 154 includes an exterior wall that is impermeable to gas, thus preventing the attractant composition from releasing from the first and/or second packages 152, 154. As an example, the second package 154 may comprise a sealed pouch fabricated from a laminate including a high barrier polyethylene terephthalate layer, an aluminum foil layer, and a polyethylene coextruded film.

In some embodiments, the first package 152 may be configured to permit one or more ingredients of the attractant composition such as, for example, an active ingredient, to permeate a wall of the first package 152 (e.g., evaporating by volatizing through the wall). For example, the first package 152 may include one or more walls fabricated from one or more materials that is permeable to gas. As an example, the one or more walls of the first package 152 may comprise polyvinylchloride (PVC). In one embodiment, the first package 152 is a hollow cylindrical tube made of PVC or similar gas permeable materials such as, for example, polyethylene. In some embodiments, the tube includes opposite ends that are both sealed closed (e.g., heat sealed), thus enclosing the attractant composition therein.

In some embodiments, the first package 152 includes an exterior wall that is configured to release the attractant composition through the exterior wall at a release rate from about 5 per day to about 500 µg per day. In some embodiments, the first package 152 includes an exterior wall that is configured to release the attractant composition through the exterior wall at a release rate from about 15 µg per day to about 400 µg per day. In some embodiments, the first package 152 is gas permeable such that the first package releases the attractant composition at a release rate of greater than about 15 µs per day on the $20^{th}$ day after the opening of the first package or, in some embodiments, greater than about 20 µg per day on the $20^{th}$ day after the opening of the first package.

In one example, the first package 152 is fabricated from polyvinylchloride (PVC) tube having heat-sealed ends. An attractant composition comprising: 19.98, % w/w, 2-hexanone (591-78-6); 19.98, % w/w, (E)-2-hexenal (6728-26-3); 19.98, % w/w, (E)-2-octenal (2548-87-0); 19.98, % w/w, dimethyl disulfide (624-92-0); 19.98, % w/w, dimethyl trisulfide (3658-80-8); 0.1, % w/w, Sudan B black (4197-25-5) is blended first to form an insect pheromone (bed bug pheromone) composition. This insect pheromone composition is then mixed and/or dissolved in mineral oil (8042-47-5) to form that attractant composition (e.g., the attractant composition having a concentration of 5.0, % w/w, insect pheromone composition and 95.0, % w/w, mineral oil). This combination of attractant composition within the PVC tube had a release rate from about 20 µg per day to about 350 µg per day. In some embodiments, the Sudan B black is removed and the concentration of the remaining five components/ingredients may be increased from 19.98, % w/w, each to 20, % w/w, each.

Test Method

The test method used to determine the release rate of the attractant composition from the first package (e.g., gas permeable package) includes the following steps.

1) A total number of attractant first packages (i.e., a gas permeable package having one or more attractant compositions enclosed therein (e.g., an insect lure package)) is determined to be included in the test group. Any number can be included in the test group, but the test group should include at least 20 attractant first packages, preferably 50.
2) Measuring the total mass of the first attractant packages in the test group at the same time, immediately after each attractant first package has been opened (e.g., removed from a gas impermeable package or gas impermeable storage container and thus exposed to the atmosphere). This provides the total mass (e.g., in micrograms (µg)) of the attractant first packages (e.g., total mass of a minimum of 20, preferably 50, attractant first packages) at the starting point (e.g., $T_0$=0 days).

3) After a first period ($T_1$) in days (each day equals a 24 hour period) has transpired from the point the attractant first packages were exposed to the atmosphere, the mass of all the attractant first packages (e.g., minimum 20, preferred 50) is measured in total again. It is preferred that the first period equals three (3) days (e.g., $T_1$=3 days). However, the first period can be any period of days, but preferably more than one (1) day.

4) The total mass of the attractant first packages in the test group at step 2 (e.g., $T_1$=3 days) is then subtracted from the total mass measured at step 1 ($T_0$=0). This provides the total mass loss (e.g., μg) for the attractant first packages in the test group after the first period (e.g., $T_1$=3 days).

5) This total mass loss at $T_1$ is then divided by the number of units in the first time period ($T_1$=3 days). Thus, the total mass loss is divided by three (3) days to provide the average total mass loss per unit of time (e.g., μg per day).

6) This average total mass loss per day is then divided by the total number of attractant first packages in the test group (e.g., a minimum of 20, preferably 50) to provide an average total mass loss per day per attractant first package (e.g., μg per day per attractant first package).

7) After a second period ($T_2$) in days has transpired from $T_1$ (e.g., $T_2$=3 days), the mass (e.g., μg) of all the attractant first packages in the test group is measured in total again. The second period can be any period of days, but preferably more than one (1) day.

8) The total mass of the attractant first packages in the test group measured at step 7 ($T_2$) is then subtracted from the total mass measured of the attractant first packages at step 3 ($T_1$). This provides the total mass loss (e.g., μg) for the attractant first packages in the test group from the first time period ($T_1$) through the second period (e.g., $T_2$=3 days).

9) This total mass loss at $T_2$ is then divided by the number of units in the second time period (e.g., $T_2$=3 days). Thus, the total mass loss is divided by three (3) days to provide the average total mass loss per unit of time (e.g., μg per day) during this period.

10) This average total mass loss per unit of time (per day) is then divided by the total number of attractant first packages in the test group to provide an average total mass loss per day per attractant first package (e.g., μg per day per attractant first package) during the second time period ($T_2$).

11) After a $n^{th}$ period ($T_a$) in days has transpired from $T_{n-1}$, the mass (e.g., μg) of all the attractant first packages in the test group is measured in total again.

12) The total mass of the attractant first packages in the test group measured at step 11 ($T_a$) is then subtracted from the total mass measured of the attractant first packages at ($T_{n-1}$). This provides the total mass loss (e.g., μg) for the attractant first packages in the test group from the n−1 period ($T_{n-1}$) through the $n^{th}$ period ($T_n$).

13) This total mass loss at $T_n$ is then divided by the number of units of time (e.g., days) in the $n^{th}$ period ($T_n$) to provide the average total mass loss per unit of time (e.g., μg per day) during this period.

14) This average total mass loss per unit of time (e.g., per day) is then divided by the total number of attractant first packages in the test group to provide an average total mass loss per day per attractant first package (e.g., μg per day per attractant first package) during the $n^{th}$ period ($T_n$).

15) Steps 11-14 are repeated to calculate the average total mass loss per day per attractant first package through day twenty (20).

16) Steps 11-14 may be repeated to calculate the average total mass loss per day per attractant first package through any other number of units of time (e.g., 25 days, 30 days, etc.).

In some embodiments, a method of capturing one or more insects may include peeling a protective sheet from an adhesive layer on a substrate, connecting the substrate to a bottom surface of a first housing via the adhesive such that the adhesive of the substrate forms a floor of a trap chamber of a trap, applying a force to an actuator to open a package containing an attractant composition within the trap and causing the attractant composition to release and attract insects, placing the trap in a location (e.g., a bed, floor, etc.) with an inlet of the trap in its open position, and allowing the trap to sit in the location for a period of time. After a period of time has transpired, the method may further include viewing into a window (e.g., lifting or peeling cover 80 back from transparent portion of second housing 60) to determine whether any insects, having been lured into the trap chamber via the attractant composition, are captured within the trap chamber via any of the trap embodiments shown and described herein (e.g., pit, adhesive, histamine, and/or combinations thereof). If insects are captured within the trap chamber, the method may include a user closing the inlet to the trap chamber (e.g., applying a force to second housing 60 to move it from the first position to the second position). Once closed, the method may include removing the trap from the location. It is understood that any of these steps may be removed, the order rearranged, and/or other steps added to such method. Additionally such method and one or more of its steps may be applied to any of the other trap embodiments shown and described herein.

In operation, some embodiments may be activated by applying a force to the button 46 which causes the protrusion to move inward within the reservoir 40 such that it pierces the second package 154 of the attractant 150 disposed with the reservoir 40 of the trap 1. Once the force is released, the button 46 and protrusion retract back to their original positions, thus moving the protrusion away from the puncture hole it created within the second package 154. Upon this puncturing of the second package 154, the one or more ingredients of the attractant composition begin to volatilize and release through the first package 152, attracting and luring one or more insects (e.g., bed bug(s)) into the inlet 72 of the trap 1. Once inside the trap chamber 70, the one or more insects may be trapped and/or captured by one or more of the trap embodiments (techniques/methods) shown and disclosed herein (e.g., adhesive, pit, histamine, pesticide, or combinations thereof). Once captured, a user may view into the trap chamber 70 through a transparent portion of second housing 60 (which may include lifting or peeling cover 80 from the second housing 60). A user may apply a force to the second housing 60 to move it from the first position to the second position, thus closing the inlet 72.

Figure 17:
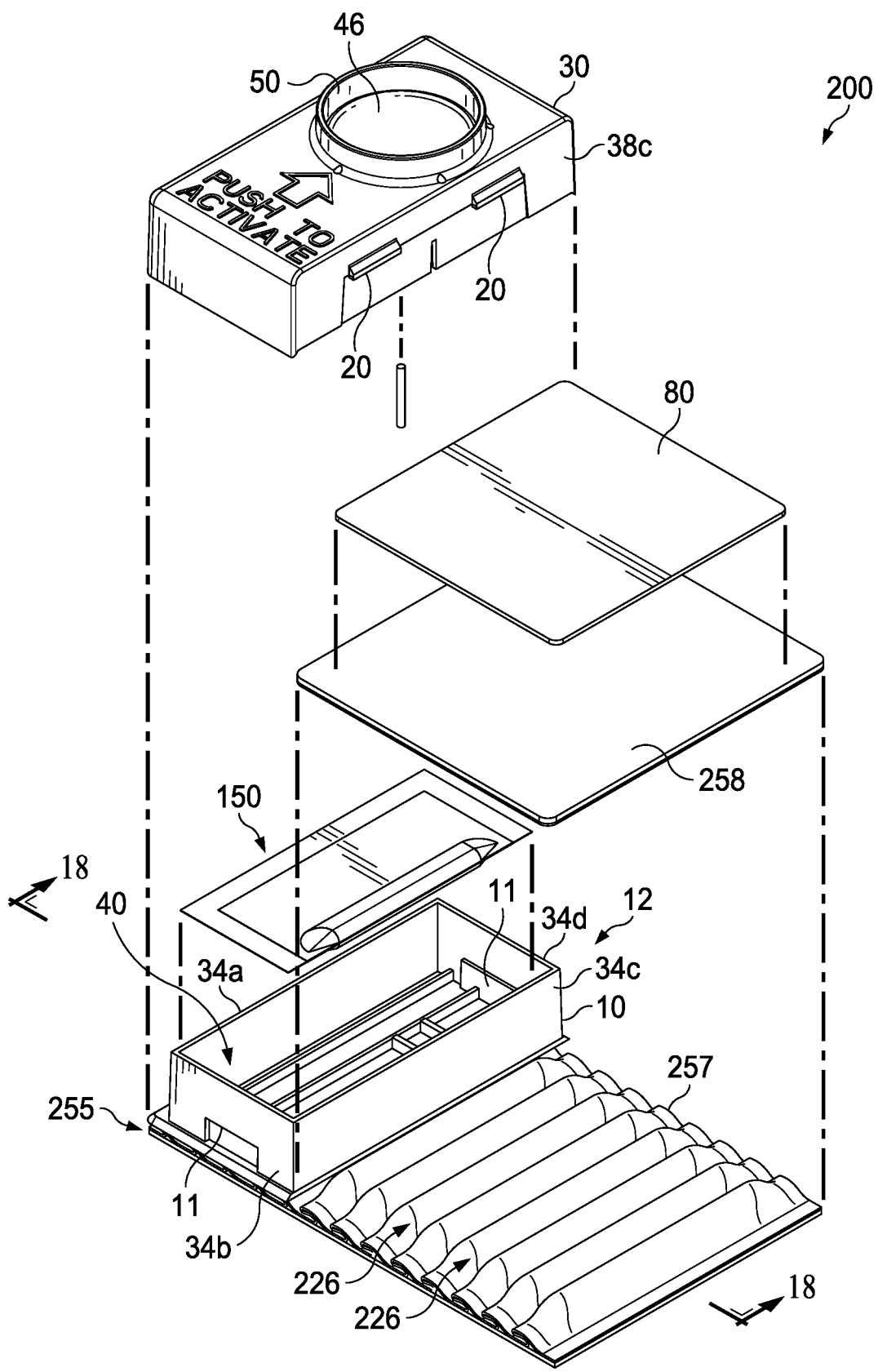
FIG. 17 is an exploded view of an insect trap according to one or more embodiments.
Figure 18:
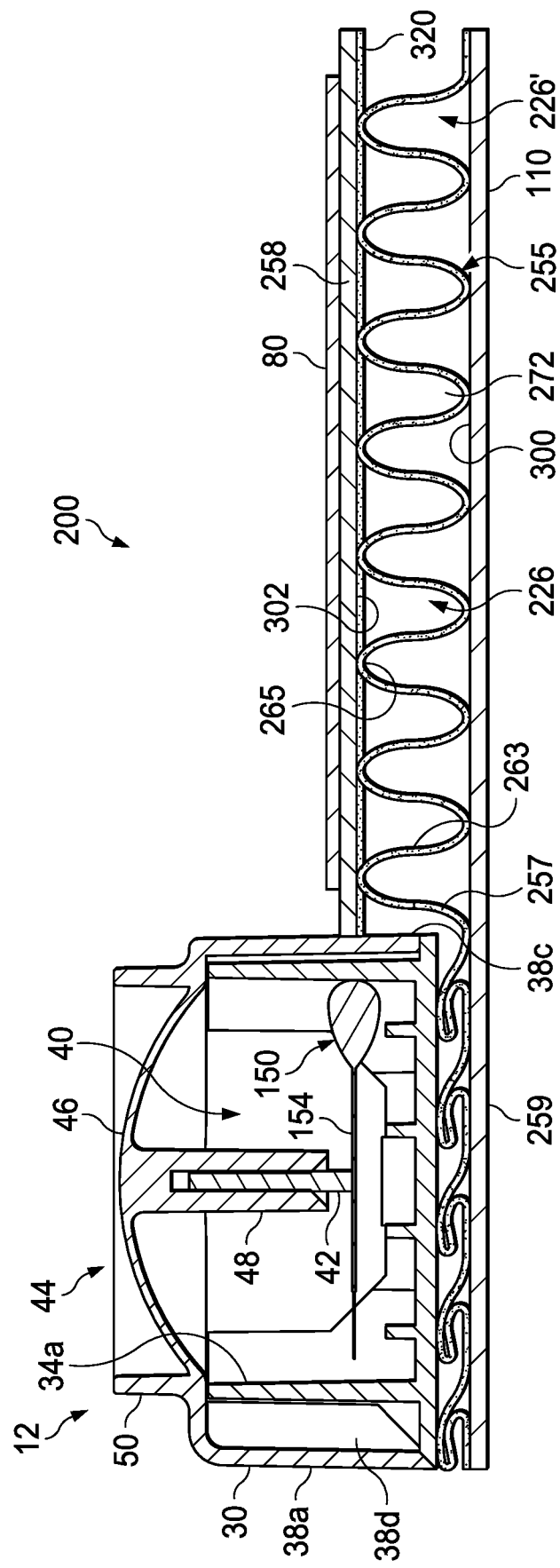
FIG. 18 is a cross sectional side view of the trap of FIG. 17 taken at lines 18-18.

Referring to FIGS. 17 and 18, an embodiment of an insect trap 200 is shown. The insect trap 200 generally may include a housing 10, a reservoir 40 at least partially disposed within or defined by the first housing, a protrusion 42 disposed within the reservoir, an actuator 44 connected to and configured to actuate the protrusion, a substrate 255, a first cover 258, a trap chamber 270 partially formed by the housing and the substrate, and an inlet 272 providing an entrance into the trap chamber. The trap chamber may include a floor 300.

The inlet 272 is open, permitting insects to enter and/or exit the trap chamber 270. The trap 200 may include a longitudinal axis (L-L') as shown.

As shown in FIGS. 17 and 18, the substrate 255 comprises a continuous wall 257 defining a first plurality of interior channels 226. The substrate 255 may define a second plurality of interior channels 226' on the opposite side of the continuous wall 257 from the first plurality of interior channels 226. In the illustrated embodiment, the channels 226 are open in a direction away from the floor 300, and the channels 26' are open in a direction towards the floor 300. Each channel 226, 226' is disposed between two adjacent angled portions 263 of the continuous wall 257 or an angled portion of the continuous wall and the third upper housing wall 38c. Between each of the adjacent angled portions 263 of the continuous wall 257 are arcuate or rounded portions 265 that define a floor of the channels 226, 226'. While the channels 226, 226' in the illustrated embodiment have a U-shaped cross-section, the cross-section may have another shape. The plurality of interior channels 226, 226' may have any length and height. In some embodiments, the height of each channel 226, 226' may be about 0.08 in. The plurality of channels 226 forms a plurality of sub-chambers within the trap chamber 270. In some embodiments, the substrate 255 is configured to prevent insects from entering the plurality of channels 226'. For example, in the illustrated embodiment, the ends of the channels 226' are pinched together or flattened, i.e., closing off the entrance(s) to the channels 226', so that insects may not enter. In some embodiments, the substrate 255 also includes a bottom wall 259 coupled to the continuous wall 257. The substrate 255 is coupled to the housing 10 such as, for example, using adhesive to adhere the substrate 255 to the housing 10. In some embodiments, a portion of the substrate 255 extends under the housing 10. In other words, the housing 10 may be positioned on the substrate 255. Where the continuous wall 257 extends under the housing 10, the channels 226, 226' may be closed (e.g., flattened) to prevent insects from entering the space below the housing 10.

In some embodiments, the substrate 255 is made from paper or fiber. As an example, the substrate 255 may be made of single face corrugated paper or paperboard. The substrate 255 and/or its features and components may comprise any number of configurations, sizes, shapes, components, designs, and/or other materials (e.g., composites, metals, etc.). The substrate 255, and one or more of its components, may be fabricated as a unitary, monolithic component. In some embodiments, the substrate, and one or more of its components, may be fabricated as multiple components that may be connected (e.g., fixedly or removably) to each other, using any connection method described herein and/or any other conventional or yet-to-be developed connections and/or connection techniques.

In the embodiment shown, the ceiling 302 of the trap chamber 270 is formed by the first cover 258. An adhesive 320 may coat a portion or all of a surface (e.g., a lower surface 312) of the first cover 258. In some embodiments, more than one surface may be partially or completely coated with an adhesive. In some embodiments, a portion or all of the first cover 258 may be transparent and/or translucent to permit a user to view through the transparent or translucent portion of the first cover 258 and adhesive 320 into the trap chamber 270. The first cover 258 is adhered via adhesive 320 to the continuous wall 257 of the substrate 255. When connected as such to the substrate 255, the first cover 258 places and thus provides an adhesive coated substrate as the ceiling 302 in each of the channels 226 and thus the trap chamber 270. Additionally, the first cover 258, depending on the material used, may increase the stability or structural strength of the substrate 255. In some embodiments, the first cover 258 is made from plastic such as, for example, polyethylene terephthalate (e.g., Mylar®). An example first cover is a clear sticky panel trap including No-Mess Adhesive™ provided by Alpha Scents, Inc. In some embodiments, the first cover 258 may include, temporarily, a protective substrate (e.g., wax paper) that is removably connected to the substrate via the adhesive 320 to cover and protect the adhesive. The first cover 258 may be unconnected from the substrate 255 and then, after purchase, a user may peel off the protective sheet and adhere the first cover 258 to the substrate 255 as described above herein.

An inlet 272 is defined between the upper surface of the continuous wall 257 of the substrate 255 and the bottom surface of the first cover 258 as shown in FIGS. 17 and 18. For example, an insect may enter the inlet 272 and walk onto an arcuate portion of the wall 257. The insect may continue walking through the channel 226 and become adhered to the adhesive 320 on the bottom surface of the first cover 258 (i.e., near the ceiling 302 of the trap chamber 270).

In some embodiments, a method of capturing one or more insects may include peeling a protective sheet from an adhesive layer on a cover, connecting the substrate to a top surface of a substrate via the adhesive such that the adhesive of the cover forms a ceiling of a trap chamber of a trap, applying a force to an actuator to open a package containing an attractant composition within the trap and causing the attractant composition to release and attract insects, placing the trap in a location (e.g., a bed, floor, etc.), and allowing the trap to sit in the location for a period of time. After a period of time has transpired, the method may further include viewing into a window (e.g., through the cover 258 or lifting or peeling a separate cover (e.g., cover 80) back from transparent portion of the cover 258) to determine whether any insects, having been lured into the trap chamber via the attractant composition, are captured within the trap chamber via any of the trap embodiments shown and described herein (e.g., adhesive, histamine, and/or combinations thereof). If insects are captured within the trap chamber, the method may include removing the trap from the location. It is understood that any of these steps may be removed, the order rearranged, and/or other steps added to such method. Additionally such method and one or more of its steps may be applied to any of the other trap embodiments shown and described herein.

The invention can be further understood by reference to examples, of which summaries and detailed descriptions follow. These examples are provided by way of illustration and are not meant to be limiting.

Example 1

Maintaining a Colony of Common Bed Bugs for Production of Exuviae and Use in Bioassays A colony of common bed bugs was kept in an insectary at 22-24° C., ambient relative humidity, and a photoperiod of 10 hours dark to 14 hours light. To collect pheromone for extraction, isolation, and identification, the colony was increased from 2,400 to 6,000 bed bugs and held at the higher level for 18 months.

Approximately 150 bed bugs were kept in each of 40 50-ml jars. Each jar was fitted with a piece of cardboard (2×2 cm) at the bottom and a strip (2×5 cm) of corrugated cardboard diagonally across the jar. The jar was covered with a plastic lid perforated with small holes for ventilation.

Each bed bug was allowed to feed once per month on a human volunteer. At 1,500 bed bugs per week for 30 months, this amounts to 180,000 individual feedings. Jars with bed bugs to be fed were covered with fine mesh and pressed against the volunteer's forearm so that the bed bugs could feed through the mesh. After feeding, nymphal bed bugs moult, shedding their exuvia in the process. Each exuvia of a 5th instar nymph weighs about 0.07 mg. Collecting exuviae of 1,200 5th instar nymphs (20% of the entire colony) per month, resulted in a harvest of 84 mg (1,200× 0.07 mg) of exuviae per month for a total of 1,512 mg of exuviae. This was the starting material for extraction, isolation, and identification of the aggregation pheromone.

Example 2

Figure 19A:
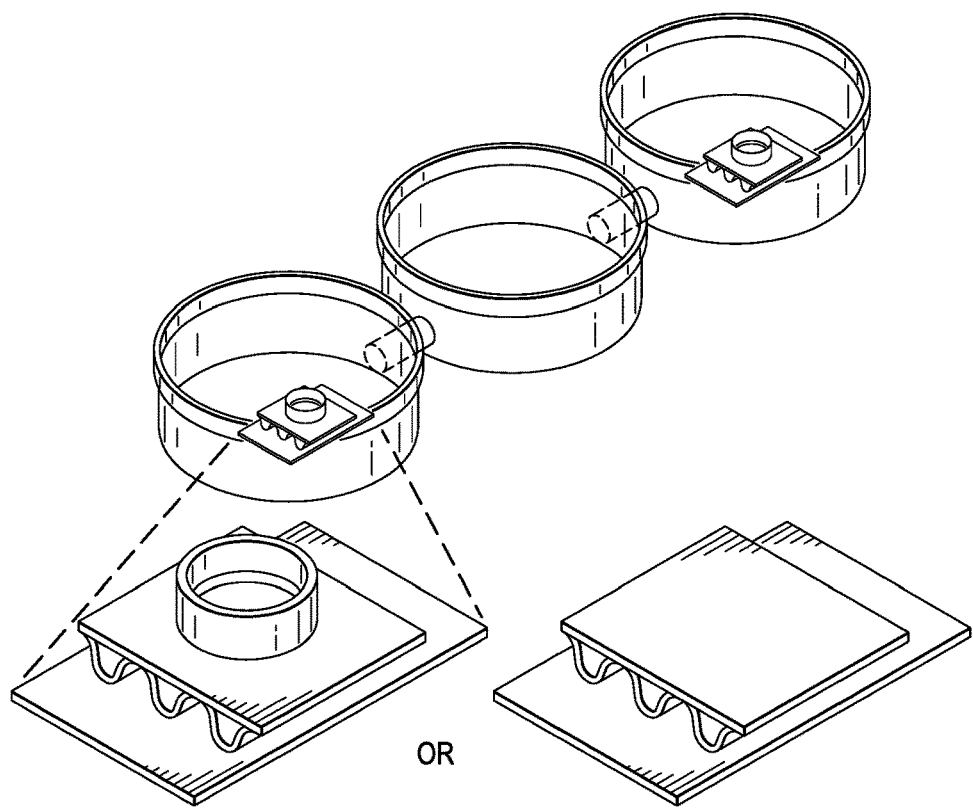
FIG. 19 illustrates the design of (a) the three-dish, dual-choice olfactometer, and (b) the large Plexiglass arena; the inserts illustrate the bed bug shelter consisting of histamine-impregnated or control filter paper (FP), corrugated cardboard (CC), and an inverted vial lid (IVL) containing volatile pheromone components formulated in mineral oil or mineral oil alone.
Figure 19B:
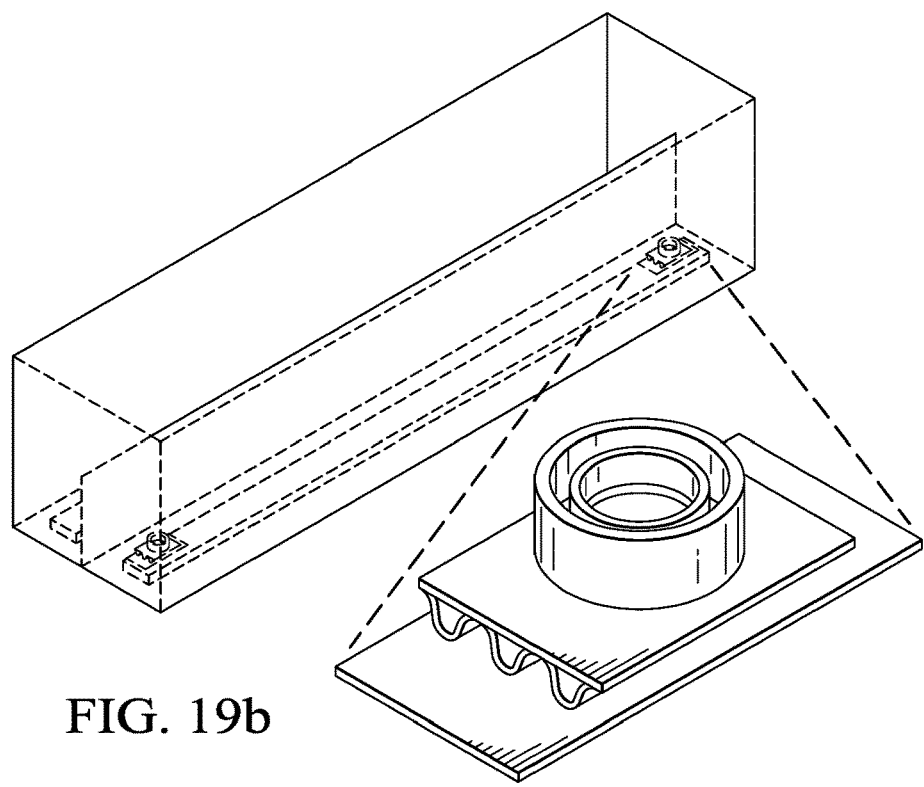

General Experimental Design to Investigate the Response of Bed Bugs to Test Stimuli Bioassays were run in dual-choice olfactometers and in large Plexiglass arenas (FIG. 19). Dual-choice olfactometers consisted of two lateral Pyrex® glass Petri dishes, connected to a central dish (all dishes 3×9 cm inner diameter) via a Pyrex® glass tube (2.5 cm long×2 cm inner diameter). The dishes in this olfactometer mimic the natural still-air shelters in which bed bugs spend the day. Prior to the start of bioassays, a disc of paper toweling (9 cm diameter) was placed into each dish and a strip of paper toweling (2.4×0.6 cm) was inserted into the connecting glass tubing to provide traction for walking bed bugs. In addition, a piece of filter paper (2×3 cm; Whatman) was placed into each lateral dish and covered with a piece of cardboard (2×2 cm) as a refuge for bioassay insects.

Treatment and control stimuli were randomly assigned to each lateral dish. Olfactometers were enclosed in opaque plastic bins to prevent light from entering and affecting the insects' responses. For each replicate, a single $3^{rd}$, $4^{th}$, or $5^{th}$ instar $C.$ $lectularius$ nymph was released into the central chamber of the olfactometer, which was then covered with a glass plate to prevent escape. The single bed bug in each olfactometer was then allowed to explore all chambers. Each insect was released into an olfactometer at the end of the 14-h photophase allowing it to explore the chambers during 10 h of darkness, and to come to rest in one of the shelters during 10 h of light. After this 20-h period, the insect's position within the olfactometer was recorded. Any insects not found in a lateral chamber were recorded as non-responders. All experimental replicates were run at 24±2° C. and 30-60% RH. Olfactometers were washed with Sparkleen detergent (Fisher Scientific Co, Pittsburgh, PA, USA), and were oven-dried (Precision, Winchester, VA, USA) between each bioassay.

The large two-chamber Plexiglass arena (180 cm long×12 cm high×13 cm wide) was designed with a central divider (180 cm long×5.5 cm high) to accommodate two pieces of wood (162 cm long×3.8 cm wide×0.8 cm high), each piece for testing the response of a single bed bug to a pheromone-baited shelter or a control shelter (see insert in FIG. 19) which were randomly assigned to either end of the wood. As some bed bugs succeeded in crossing over the divider, from one chamber to the other, all experimental replicates used only one chamber of each arena. For each replicate, a single bed bug was placed in the center of the wood piece just prior to the end of the 14-h photophase, and its position was scored the next morning after the onset of the photophase.

Example 3

Evidence that Bed Bug Exuviae (Cuticle Shed During Moulting) Induce Arrestment of Foraging Bed Bugs: Effect of Number and Age of Exuviae Tested Experiment 1 tested whether 50 exuviae of $5^{th}$ instar nymphal bed bugs (1 exuvia=0.08 mg) induce arrestment of foraging $5^{th}$ instar nymphs. Given a strong arrestment response of nymphs to 50 exuviae (see Table 1), follow-up Experiments 2-4 tested whether fewer numbers of exuviae would suffice to induce arrestment responses. Experiment 5 explored whether exuviae which were aged at room temperature for 2 months are still effective in inducing arrestment of bed bugs.

In Experiments 1-4, 50, 10, 2 or 1 exuviae were unexpectedly all equally effective in inducing arrestment of bed bugs (Table 1). In Experiment 5, exuviae after 2 months of storage at room temperature still induced arrestment of bed bugs.

Table 1 illustrates the effect of number and age of exuviae on the response of bed bugs in the three-dish, dual-choice olfactometer in Expeirments (Exp.) 1-5.

| Exp. no. | No. exuviae | No. arrested in baited chamber | No. arrested in control chamber | No. non-responders |
|---|---|---|---|---|
| 1 | 50 | 12 | 0 | 0 |
| 2 | 10 | 12 | 0 | 0 |
| 3 | 2 | 21 | 1 | 2 |
| 4 | 1 | 10 | 2 | 0 |
| 5 | 2 (stored 1 month) | 12 | 0 | 0 |

Example 4

Efficacy of Organic Solvent to Extract Pheromone from Exuviae

Experiments 6-10 tested the efficacy of different organic solvents (hexane, ether, dichloromethane, acetonitrile, methanol) to extract pheromone from exuviae. Each olfactometer experiment tested 6-exuviae equivalents of extracts, i.e., the amount of material, possibly including pheromone, which could be extracted from a total of six exuviae.

In Experiments 6-9, hexane, ether, dichloromethane and acetonitrile were not effective in extracting pheromone from exuviae and inducing an arrestment response of $3^{rd}$ to $5^{th}$ instar nymphs (Table 2). In Experiment 10, the methanol extract of exuviae induced a strong arrestment response (Table 2), indicating that the bed bug arrestment pheromone component was present in the methanol extract.

Table 2 illustrates the effect of organic solvent used for extraction of exuviae on the response of bed bugs in the three-dish, dual-choice olfactometer in Experiments (Exp.) 6-10.

| Exp. no. | Solvent tested | No. arrested in baited chamber | No. arrested in control chamber | No. non-responders |
|---|---|---|---|---|
| 6 | Hexane | 6 | 6 | 0 |
| 7 | Ether | 3 | 5 | 4 |
| 8 | Dichloromethane | 1 | 7 | 3 |
| 9 | Acetonitrile | 4 | 7 | 2 |
| 10 | Methanol | 10 | 1 | 0 |

Example 5

Isolation of the Arrestment Pheromone Component

Presence of the arrestment pheromone component in the methanol extract of exuviae (Table 2; Exp. 10) indicated that it had a molecular structure of significant polarity. To isolate the pheromone component for structural elucidation, exuviae were extracted in sequence in organic solvents of increasing polarity (hexane, ether, dichloromethane, acetonitrile, and methanol). Consequently, the final methanol extract contained primarily polar compounds. This methanol extract was then fractionated through silica gel (0.6 g) in a glass column (14 cm long×0.5 cm inner diameter). After the silica was pre-rinsed with pentane, the methanol extract was applied, allowed to impregnate the silica gel, and then eluted with 5 consecutive rinses (2 ml each) of pentane/ether, with increasing proportions of ether [1) 100:0; 2) 90:10; 3) 80:20; 4) 50:50; 5) 0:100], followed by five consecutive rinses (1 ml each) of dichloromethane/methanol, with increasing proportions of methanol [1) 100:0; 2) 90:10; 3) 80:20; 4) 50:50; 5) 0:100]. The five dichloromethane/methanol fractions were then bioassayed in Experiments 11-15.

In Experiments 11-15 (Table 3), only the silica fraction with 50% methanol as eluent (Exp. 14), induced arrestment of bed bug nymphs.

Table 3 illustrates the effect of the solvent system on eluting the bed bug arrestment pheromone component(s) from silica gel. Note that only the test stimulus in Experiment 14, consisting of dichloromethane ($CH_2Cl_2$; 50%) and methanol (MeOH; 50%) as eluents, induced arrestment responses in bed bugs in the three-dish, dual-choice olfactometer.

| Exp. no. | Solvent system | No. arrested in baited chamber | No. arrested in control chamber | No. non-responders |
|---|---|---|---|---|
| 11 | $CH_2Cl_2$ (100%) | 5 | 6 | 1 |
| 12 | $CH_2Cl_2$/MeOH (10%) | 5 | 5 | 2 |
| 13 | $CH_2Cl_2$/MeOH (25%) | 6 | 4 | 2 |
| 14 | $CH_2Cl_2$/MeOH (50%) | 9 | 2 | 1 |
| 15 | MeOH (100%) | 4 | 2 | 6 |

This protocol for pheromone isolation was repeated in the same or slightly modified form several times. Each time, the responses of bioassay insects to silica fractions indicated that the arrestment pheromone component was present in a fraction eluted with 50% or 100% methanol. These results combined clearly revealed that the arrestment pheromone component is highly polar.

Example 6

Pheromone Identification: Micro-Analytical Treatments of Bio-Active Extract

To determine whether the polar arrestment pheromone component has an acid, amine, or alcohol functionality, methanol extracts of exuviae (see Table 2) were subjected to micro-analytical treatments with diazomethane (converts acids to esters) or acetic anhydride in pyridine (converts alcohols to esters) and then bioassayed in Experiments 16 and 17.

In Experiment 16 (Table 4), diazomethane-treated methanol extract of exuviae induced arrestment responses of bed bug nymphs, indicating that the diazomethane treatment did not alter the pheromone molecule and that this pheromone component does not likely have an acid functionality. Conversely, in Experiment 17, acetic anhydride-treated methanol extract of exuviae failed to induce arrestment of bed bug nymphs, indicating that the acetic anhydride treatment had altered the molecular structure of the pheromone component and that it had one or more hydroxyl and/or amine groups. Table 4 illustrates the effect of micro-analytical treatments of pheromone extract on the arrestment responses of bed bug nymphs in Experiments 16 and 17. Note that the acetic anhydride treatment of methanol extract of exuviae altered the molecular structure of the pheromone component and thus failed to induce a significant arrestment response of bed bug nymphs in the three-dish, dual-choice olfactometer.

| Exp. no. | Treatment | No. arrested in baited chamber | No. arrested in control chamber | No. non-responders |
|---|---|---|---|---|
| 16 | Diazomethane-treated pheromone extract | 9 | 0 | 3 |
| 17 | Acetic anhydride-treated pheromone extract | 3 | 6 | 3 |

Example 7

Pheromone Identification: Nuclear Magnetic Resonance Spectroscopy (NMR) of Bioactive Extract To elucidate the molecular structure of the arrestment pheromone component, the $^1H$ NMR spectra of several methanol extracts of exuviae and feces were examined and compared. Analyses of the $^1H$ NMR spectra revealed several common components that were identified as L-valine, L-alanine, N-acetylglucosamine, histamine, dimethylaminoethanol, and 3-hydroxykynurenine O-sulfate.

Valine, alanine, N-acetylglucosamine, histamine, and dimethylaminoethanol were identified by comparison of the observed $^1H$ and $^{13}C$ NMR and mass spectrometric data with those reported previously for these compounds. In addition, authentic samples of L-valine, N-acetylglucosamine, histamine, and dimethylaminoethanol were purchased from commercial vendors and added to a crude methanol extract in separate experiments. In each of these additional experiments, the resonances observed in the $^1H$ NMR spectra recorded on the crude methanol extract and assigned to a specific component (i.e., L-valine, L-alanine, N-acetylglucosamine, histamine, and dimethylaminoethanol) were enhanced by the addition of an authentic sample of that component, confirming the identity and occurrence of these chemicals in the crude methanol extracts.

The structure of 3-hydroxykynurenine O-sulfate was proposed following comparison of specific resonances observed in the $^1H$ NMR spectra recorded on the crude methanol extracts to those reported previously for 3-hydroxykynurenine O-sulfate. Additionally, an authentic sample of 3-hydroxykynurenine O-sulfate was prepared from 3-hydroxykynurenine following protection of the carboxylic acid as a methyl ester and the amine function as a carboxybenzyl amide. Sulfation of the free alcohol using Me3N—SO$_3$, followed by removal of the carboxybenzyl protecting group by hydrogenolysis and hydrolysis of the methyl ester provided an authentic sample of 3-hydroxykynurenine O-sulfate. The $^1$-D and $^2$D NMR spectra ($^1$H, COSY, HMQC, HMBC) recorded on the synthetic sample of 3-hydroxykynurenine O-sulfate were in complete agreement with the natural material present in the crude methanol extract.

Table 5 summarizes the relative amounts of each of these components in each of five individual methanol extracts, and Table 6 shows the biological activity of each extract in Experiments 18-22. Note that the highest response levels (Exp. 18-20) were achieved with the three extracts in which histamine and dimethaminoethanol were both present in appreciable amounts.

Table 5 illustrates the relative amount in mg of each of the common components found in the methanol extracts of bed bug exuviae and feces.

| | Extract No. | | | | |
|---|---|---|---|---|---|
| Compound | 1 | 2 | 3 | 4 | 5 |
| L-Valine | 0.14 | 0.07 | 0.0 | 0.0 | 0.06 |
| L-Alanine | 0.0 | 0.0 | 0.0 | 0.0 | 0.0 |
| N-Acetylglucosamine | 0.0 | 0.0 | 0.0 | 0.25 | 0.0 |
| 3-Hydroxykynurenine O-sulfate | 3.7 | 2.5 | 3.2 | 0.48 | 2.1 |
| Histamine | 4.7 | 1.9 | 8.2 | 0.0 | 0.0 |
| Dimethylaminoethanol | 3.0 | 0.7 | 0.9 | 0.0 | 0.0 |

Table 6 illustrates the responses of bed bugs in bioassays in the three-dish, dual-choice olfactometer of the five extracts analyzed for constituent components in Table 5.

| Extract No. | Experiment No. | No. arrested in baited chamber | No. arrested in control chamber | No. non-responders |
|---|---|---|---|---|
| 1 | 18 | 10 | 1 | 1 |
| 2 | 19 | 10 | 1 | 1 |
| 3 | 20 | 10 | 1 | 1 |
| 4 | 21 | 9 | 2 | 2 |
| 5 | 22 | 7 | 4 | 2 |

Example 8

Histamine: A Pheromone Component of Bed Bugs

With the highest response levels of bed bugs achieved with extracts in which histamine and dimethylaminoethanol were both present (Tables 5, 6), follow-up experiments were designed to test the response of bed bugs to authentic standards. In Experiments 23-25, increasing doses of dimethylaminoethanol and histamine at a ratio of 1:1 improved the bed bugs' arrestment response (Table 7). Experiments 26-28 then tested dimethylaminoethanol (20 µg) and histamine (20 µg), with histamine presented as a base, salt or base and salt. The results reveal that histamine only as a base elicits the bed bugs' arrestment response (Table 7). Consequently, all further experiments deployed histamine as a base.

Experiments 29-31 tested whether a 10-fold (from 20 µg to 200 µg) increase of dimethylaminoethanol or of histamine improves lure effectiveness. The results indicate that the 10-fold increase of histamine enhances the bed bugs' arrestment response (Table 7). Drawing on results of Experiments 29-31, Experiments 32-34 tested dimethylaminoethanol and histamine at a 1:10 ratio at doses of 2 µg:20 µg, 20 µg:200 µg, and 200 µg:2000 µg. The results show that the two highest doses are very effective in eliciting an arrestment response by bed bugs (Table 7). To determine the effect of dimethylaminoethanol or histamine in the 2-component blend, Experiments 35-37 tested dimethylaminoethanol and histamine alone at 200 µg each and in binary combination at a ratio of 20 µg:200 µg. The data reveal that histamine, but not dimethylaminoethanol, is bioactive on its own, and at the dose tested is as effective as the 2-component blend in arresting bed bugs.

Experiments 23-37 do not define a clear role for dimethylaminoethanol. On the one hand, when dimethylaminoethanol and histamine were offered at a ratio of 2 µg:20 µg in Experiment 32, there was no preferential selection of the baited chamber. However, when the dose of dimethylaminoethanol was raised to 20 µg, equal to that of histamine, in Experiments 24 and 29, a preference for the baited chamber appeared. On the other hand, unlike histamine in Experiment 37, dimethaminoethanol alone in Experiment 36 was inactive. Moreover, increasing the dose of dimethylaminoethanol 10-fold in Experiments 32, while the dose of histamine was held constant, did not result in an increased response. Table 7 illustrates the responses in the three-dish, dual-choice olfactometer of bed bug nymphs in Experiments 23-37 to 1- or 2-component baits of dimethylaminoethanol (D) and histamine (H); numbers in parentheses indicate amounts in micrograms.

| Exp. no. | Bait* | No. insects in bait chamber | No. insects in control chamber | No. insects not responding |
|---|---|---|---|---|
| 23 | D (2): H (2) | 4 | 4 | 4 |
| 24 | D (20): H (20) | 8 | 2 | 2 |
| 25 | D (200): H (200) | 12 | 0 | 0 |
| 26 | D (20): H (20) (base) | 10 | 1 | 1 |
| 27 | D (20): H (20) (salt) | 5 | 4 | 3 |
| 28 | D (20): H (20) (base/salt) | 9 | 1 | 2 |
| 29 | D (20): H (20) | 15 | 5 | 4 |
| 30 | D (200): H (20) | 13 | 4 | 7 |
| 31 | D (20): H (200) | 20 | 2 | 2 |
| 32 | D (2): H (20) | 6 | 5 | 2 |
| 33 | D (20): H (200) | 10 | 2 | 0 |
| 34 | D (200): H (2000) | 10 | 1 | 1 |
| 35 | D (20): H (200) | 33 | 11 | 4 |
| 36 | D (200): H (0) | 14 | 15 | 19 |
| 37 | D (0): H (200) | 35 | 10 | 3 |

Example 9

Effect of Additional Components (L-Valine, L-Alanine, N-Acetylglucosamine, 3-Hydroxy-Kynurenine O-Sulfate) on the Blend of Histamine and Dimethylaminoethanol With other constituents being present in methanol extracts of bed bug exuviae or feces (Table 5), Experiments 38 and 39, and 40 and 41, tested whether the 2-component blend of dimethylaminoethanol and histamine (20 µg:200 µg) would become more effective through the addition of L-valine, L-alanine and N-acetylglucosamine (Experiment 39), or the addition of 3-hydroxy-kynurenine O-sulfate (Experiment 41). The data reveal that the effectiveness in arresting bed bugs of the 2-component blend of dimethylaminoethanol and histamine (Experiments 38 and 40) could not be improved by the addition of other components (Table 8).
Table 8 illustrates the responses of bed bug nymphs in the three-dish, dual-choice olfactometer in Experiments 38-42 to the 2-component bait of dimethylaminoethanol (D) and histamine (H) or the same bait with additional components [L-valine (V), L-alanine (A), N-acetylglucosamine (N-ac), 3-hydroxykynurenine O-sulfate (3-Hyd)] identified in methanol extracts of bed bug exuviae and feces; numbers in parentheses indicate amounts in micrograms.

| Exp. no. | Bait* | No. insects in bait chamber | No. insects in control chamber | No. insects in not responding |
|---|---|---|---|---|
| 38 | D (20): H (200) | 13 | 3 | 2 |
| 39 | D (20): H (200): V (20): A (20): N-ac (20) | 12 | 4 | 2 |
| 40 | D (20): H (200) | 10 | 2 | 0 |
| 41 | D (20): H (200): 3-Hyd (200) | 9 | 3 | 0 |

Example 10

Comparative Responses of Bed Bug Nymphs, Adult Males and Adult Females to the Blend of Dimethylaminoethanol and Histamine To determine whether the 2-component blend of dimethylaminoethanol and histamine elicits arrestment response of immature and mature stages of bed bugs, Experiments 42-44 tested dimethylaminoethanol and histamine (20 µg:200 µg) for the responses of bed bug nymphs, adult males and adult females. The data reveal that the 2-component blend is equally effective in inducing arrestment responses of nymphs, and adult males and females (Table 9).
Table 9 illustrates the responses in the three-dish, dual-choice olfactometer of bed bug nymphs, adult males or adult females to the 2-component blend of dimethylaminoethanol (D) and histamine (H); numbers in parentheses indicate amounts in micrograms.

| Exp. no. | Bait* | Insects tested | No. insects in bait chamber | No. insects in control chamber | No. insects not responding |
|---|---|---|---|---|---|
| 42 | D (20): H (200) | nymphs | 18 | 4 | 2 |
| 43 | D (20): H (200) | males | 19 | 1 | 4 |
| 44 | D (20): H (200) | females | 19 | 2 | 3 |

Example 11

Identification of Candidate Volatile Pheromone Components in Bed Bug Feces

With evidence that dimethylaminoethanol has only a limited pheromonal role (Table 7), and with histamine being less volatile and thus likely serving as an arrestant rather than an attractant, the search was continued for attractive volatile pheromone components. The focus was also shifted to bed bug feces which are present in natural bed bug shelters along with exuviae.

Figure 1:
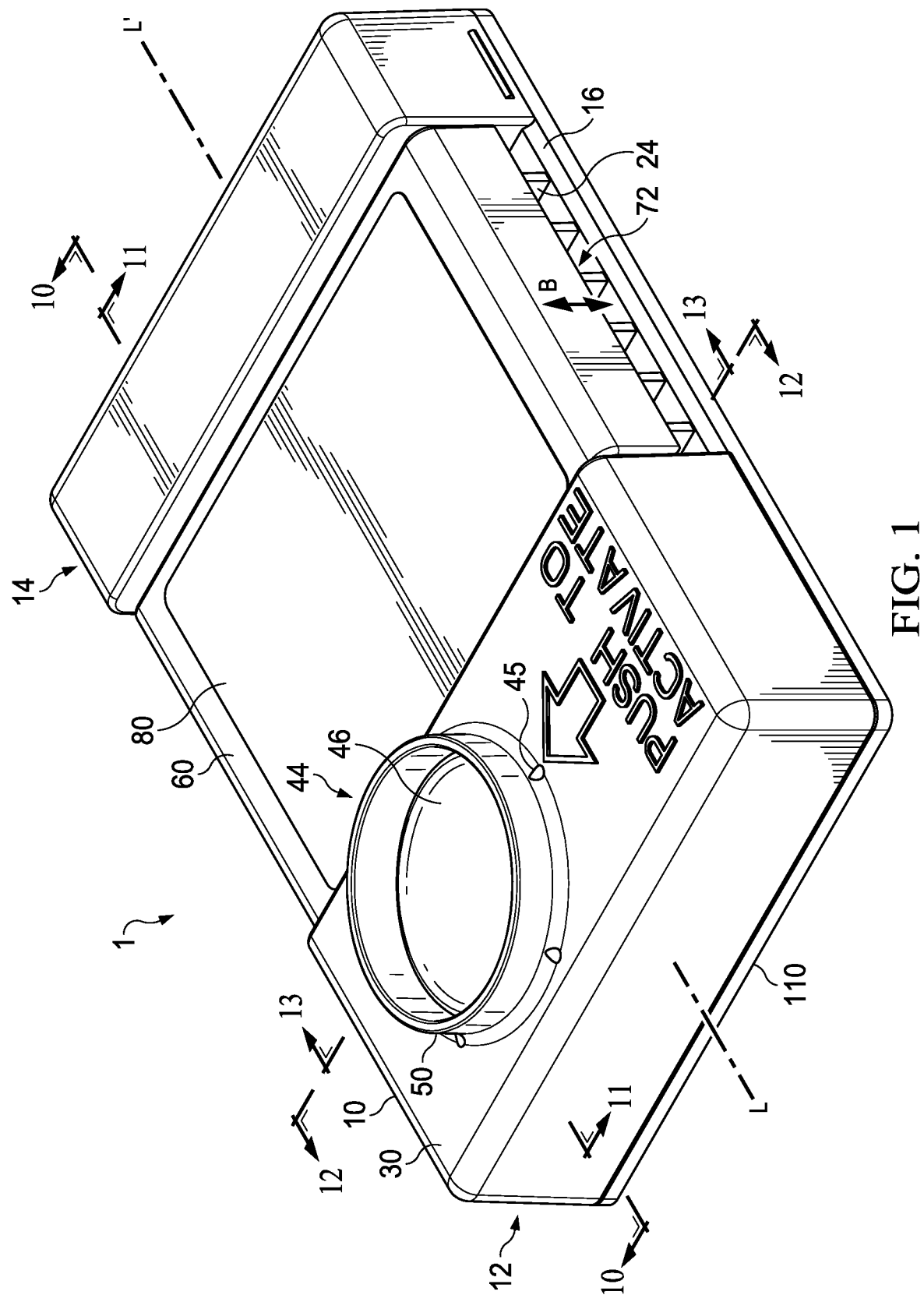
FIG. 1 is an isometric view of an embodiment of an insect trap according to one or more embodiments, wherein a second housing is in a first position.

Pieces of filter paper (5×10 cm) exposed to the feces of approximately 300 bed bugs over a period of four weeks were cut into small sections of 0.75×0.5 cm, each of which were analyzed with an Agilent Headspace Analyzer coupled to a Varian 2000 Ion Trap GC-MS fitted with a DB-5 MS GC column (30 m×0.25 µm ID). After placing the feces-stained paper into a 20-ml vial, it was sealed with a crimped cap with a 20-mm OD white silicon septum and heated to 90° C. for 5 min. The airborne headspace volatiles were withdrawn with an automated syringe and subjected to coupled gas GC-MS analysis, using the following temperature program: 50° C. for 5 min, then 10° C. per min to 280° C. The analysis revealed a complex blend of 15 oxygen- or sulphur-containing volatile components, consisting of six aldehydes (butanal, pentanal, hexanal, (E)-2-hexenal, (E)-2-octenal, benzaldehyde), one alcohol (benzyl alcohol), three ketones (2-hexanone, acetophenone, verbenone), three esters (methyl octanoate, ethyl octanoate, pentyl hexanoate) and two sulfides (dimethyl disulfide, dimethyl trisulfide). All of these 15 compounds were considered candidate pheromone components to be tested for attraction of bed bugs in dual-choice olfactometer bioassays (see EXAMPLE 2; FIG. 1).

Example 12

Responses of Adult Male Bed Bugs to Synthetic Blends at Three Doses of Bed Bug Feces Volatiles To determine whether a blend of the 15 bed bug feces volatiles that were identified in bed bug feces (see EXAMPLE 11) attracts bed bugs and thus contains one or more bed bug pheromone components, the synthetic blend (SB) was tested at a medium dose (50 µg; Experiment 45), a low dose (5 µg; Experiment 46), and a very low dose (0.5 µg; Experiment 47) for the responses of bed bugs in three-dish, dual-choice olfactometers (see EXAMPLE 2, FIG. 19). At each dose tested, all components were formulated in equal amounts in mineral oil which was pipetted into the inverted lid of a 4-ml vial. The vial was then placed on top of the corrugated cardboard shelter (see FIG. 1) in the randomly assigned treatment dish of the olfactometer (see EXAMPLE 2). The control stimulus consisted of the same type of lid on the corrugated cardboard of the control dish of the olfactometer containing mineral oil without synthetic test chemicals.
In Experiments 45-47, synthetic blends of bed bug feces volatiles at a medium, low and very low dose, all attracted more bed bug males than did control stimuli, indicating that the blend contained one or more bed bug pheromone components. The medium dose was selected for use in further experiments.
Table 10 illustrates the responses of bed bug males in the three-dish, dual-choice olfactometer to a synthetic blend (SB) of 15 bed bug feces volatiles (EXAMPLE 11) tested at a medium dose (50 µg), low dose (5µ), and very low dose (0.5 µg); at each dose, all components were formulated in equal amounts in mineral oil.

| Exp. no. | Bait* | No. insects in bait chamber | No. insects in control chamber | No. insects in not responding |
|---|---|---|---|---|
| 45 | SB (50 µg) | 29 | 7 | 0 |
| 46 | SB (5.0 µg) | 21 | 12 | 3 |
| 47 | SB (0.5 µg) | 24 | 10 | 2 |

Example 13

Determination of Pheromone Components in
Synthetic Blend of Bed Bug Feces Volatiles To determine the important component(s) in the 15-component synthetic blend (SB) of bed bug feces volatiles that attract bed bugs (EXAMPLE 12; Table 10), Experiments 48-52 compared their responses to the complete SB of all 15 components (Exp. 48), with those to SBs that lacked groups of related organic chemicals, i.e., esters (methyl octanoate, ethyl octanoate, pentyl hexanoate; Exp. 49), aldehydes (butanal, pentanal, hexanal, (E)-2-hexenal, (E)-2-octenal, benzyl aldehyde; Exp. 50), sulfides (dimethyl disulfide, dimethyl trisulfide; Exp. 51), and ketones/alcohol (2-hexanone, acetophenone, verbenone, benzyl alcohol; Exp. 52). All SBs were formulated and bioassayed as described in EXAMPLE 11.

In Experiment 48 (Table 11), the 15-component SB strongly attracted adult male bed bugs, confirming that this SB contained one or more bed bug pheromone components. Similarly, in Experiment 49 (Table 11), the SB lacking esters strongly attracted adult male bed bugs, indicating that esters are not an important part of the bed bug pheromone blend. Conversely, shelters baited with SBs lacking aldehydes (Exp. 50), sulfides (Exp. 51), or ketones and alcohol (Exp. 52), all failed to capture significantly more adult male bed bugs than control shelters, indicating that one or more of the aldehydes, sulfides, and ketones or alcohol are important bed bug pheromone components.

Table 11 illustrates the responses of adult male bed bugs in the three-dish, dual-choice olfactometer to: a 15-component synthetic blend (SB) comprising 6 aldehydes (butanal, pentanal, hexanal, (E)-2-hexenal, (E)-2-octenal, benzyl aldehyde), one alcohol (benzyl alcohol), 3 ketones (2-hexanone, acetophenone, verbenone), 3 esters (ethyl octanoate, methyl octanoate, pentyl hexanoate), and 2 sulfides (dimethyl disulfide and dimethyl trisulfide) (Exp. 48, 53 and 57); said 15-component blend minus said 3 esters, 6 aldehydes, 2 sulfides, or one alcohol and 3 ketones (Exp. 49-52, respectively); said 15-component blend minus benzaldehyde and benzyl alcohol (Exp. 54), verbenone (Exp. 55), or (E)-2-hexenal and (E)-2-octanal (Exp. 56); a 6-component synthetic blend (6-Comp. SB) comprising (E)-2-hexenal, (E)-2-octenal, 2-hexanone, acetophenone, dimethyl disulfide and dimethyl trisulfide (Exp. 58, 59, 62 and 65); and said 6-component synthetic blend minus acetophenone (Exp. 60), 2-hexanone (Exp. 61), dimethyl disulfide (Exp. 63), dimethyl trisulfide (Exp. 64), (E)-2-hexenal (Exp. 66), or (E)-2-octenal (Exp. 67). Experiments in each of the following groups were run concurrently: 48-52, 53-56, 57-58, 59-61, 62-64, and 65-67. All blends were tested at a dose of 50 μg.

| Exp. no. | Bait | No. insects in bait chamber | No. insects in control chamber | No. insects in not responding |
|---|---|---|---|---|
| 48 | SB | 18 | 4 | 2 |
| 49 | SB minus esters | 16 | 4 | 4 |
| 50 | SB minus aldehydes | 11 | 7 | 6 |
| 51 | SB minus sulfides | 10 | 7 | 7 |
| 52 | SB minus ketones and alcohol | 11 | 10 | 3 |
| 53 | SB | 12 | 6 | 2 |
| 54 | SB minus benzaldehyde and benzyl alcohol | 13 | 6 | 1 |
| 55 | SB minus verbenone | 14 | 6 | 0 |
| 56 | SB minus (E)-2-hexenal and (E)-2-octenal | 9 | 9 | 2 |
| 57 | SB | 15 | 5 | 0 |
| 58 | 6-Comp. SB | 14 | 2 | 1 |
| 59 | 6-Comp. SB | 20 | 3 | 1 |
| 60 | 6-Comp. SB minus acetophenone | 20 | 3 | 1 |
| 61 | 6-Comp. SB minus 2-hexanone | 13 | 9 | 1 |
| 62 | 6-Comp. SB | 20 | 3 | 1 |
| 63 | 6-Comp. SB minus dimethyl trisulfide | 18 | 6 | 0 |
| 64 | 6-Comp. SB minus dimethyl disulfide | 17 | 6 | 1 |
| 65 | 6-Comp. SB | 19 | 5 | 0 |
| 66 | 6-Comp. SB minus (E)-2-hexenal | 18 | 5 | 1 |
| 67 | 6-Comp. SB minus (E)-2-hexenal | 15 | 8 | 1 |

To narrow down the specific aldehyde(s), ketone(s) or sulfide(s) that constitute bed bug pheromone components, follow-up and concurrently-run experiments again tested the complete SB (Exp. 53), and SBs lacking both benzyl aldehyde and benzyl alcohol (Exp. 54), verbenone (Exp. 55), or both (E)-2-hexenal and (E)-2-octenal (Exp. 56).

In Experiment 53 (Table 11), shelters baited with the 15-component SB captured twice as many adult bed bug males as did control shelters. Similar data were obtained with SBs lacking both benzyl aldehyde and benzyl alcohol (Exp. 54) or lacking verbenone (Exp. 55), indicating that none of these three compounds is an important bed bug pheromone component. Conversely, shelters baited with the SB lacking both (E)-2-hexenal and (E)-2-octenal (Exp. 56) failed to capture more adult male bed bugs that did control shelters, indicating that one or both of these two aldehydes are bed bug pheromone components.

The combined data of Experiments 48-56 indicated that the major attractive pheromone components of bed bugs are among the following six compounds: (E)-2-hexenal, (E)-2-octenal, dimethyl disulfide, dimethyl trisulfide, acetophenone and 2-hexanone. To ascertain whether this 6-component synthetic blend (6-Comp. SB) was as effective as the 15-comp. SB in attracting bed bugs, Experiments 57 and 58 tested SB and 6-Comp. SB versus control stimuli.

In Experiment 57 (Table 11), the 15-Comp. SB, as expected, attracted significantly more adult male bed bugs than did the control stimulus. In Experiment 58, the 6-Comp. SB attracted significantly more adult male bed bugs than did the control stimulus. Because SB and 6-Comp. SB appeared equally capable of attracting bed bugs, it was concluded that all major pheromone components are present in the 6-Comp. SB.

To determine the important ketone(s) in the 6-Comp. SB, follow-up and concurrently-run experiments compared responses to the 6-Comp. SB (Exp. 59), the 6-Comp. SB lacking acetophenone (Exp. 60), and the 6-Comp. SB lacking 2-hexanone (Exp. 61).

In Experiment 59 (Table 11), the 6-Comp. SB attracted significantly more adult male bed bugs than did the control stimulus. Similarly, in Experiment 60 the 6-Comp. SB lacking acetophenone attracted significantly more adult male bed bugs than did the control stimulus, indicating that acetophenone is not an important bed bug pheromone component. Conversely, in Experiment 61, the 6-Comp. SB lacking 2-hexanone failed to attract significant numbers of adult male bed bugs, indicating that 2-hexanone is a key bed bug pheromone component.

To determine the key sulfide(s) in the 6-Comp. SB, the next three follow-up and concurrently-run experiments compared responses to the 6-Comp. SB (Exp. 62), the 6-Comp. SB lacking dimethyl disulfide (Exp. 63), and the 6-Comp. SB lacking dimethyl trisulfide (Exp. 64).

In Experiment 62, the 6-Comp. SB attracted significantly more adult male bed bugs than did the control stimulus. Similarly, the two 6-Comp. SBs lacking either dimethyl disulfide (Exp. 63) or dimethyl trisulfide (Exp. 64) were still more effective than control stimuli in attracting adult male bed bugs. However, the 6-Comp. SB with both of these sulfides (Exp. 62) appeared relatively more attractive than SBs containing just one sulfide (Exp. 63 and 64), suggesting that both of these sulfides are important pheromone components and should be included in operational lures.

To determine the key aldehyde(s) of the 6-Comp. SB, the next three follow-up and concurrently run experiments compared responses to the 6-Comp. SB (Experiment 65), the 6-Comp. SB lacking (E)-2-hexenal (Exp. 66), and the 6-Comp. SB lacking (E)-2-octenal (Exp. 67).

In Experiment 65 (Table 11), the 6-Comp. SB attracted significantly more adult male bed bugs than did the control stimulus. Similarly, in Experiment 66 the 6-Comp. SB lacking (E)-2-hexenal attracted significantly more adult male bed bugs than did the control stimulus. Conversely, in Experiment 67 the 6-Comp. SB lacking (E)-2-octenal attracted barely twice as many adult male bed bugs than did the control stimulus. The data in combination reveal that (E)-2-octenal is a relatively more important pheromone component than (E)-2-hexenal. Nonetheless, both aldehydes are to be included in a commercial bed bug pheromone lure for optimal attractiveness.

Example 14

Responses of Bed Bugs to Synthetic Pheromone Lures in Large Bioassay Arenas

Experiments 68-75 were carried out to ascertain whether bed bugs respond to synthetic pheromone not only in small olfactometers (EXAMPLE 2; FIG. 1; Tables 7-11) but also in large bioassay arenas. Experiments 68-75 also investigated the effect of the volatile pheromone components (VPCs) (E)-2-hexenal, (E)-2-octenal, dimethyl disulfide, dimethyl trisulfide and 2-hexanone, and the effect of the less-volatile pheromone component histamine (H), on attraction and arrestment of bed bugs. Treatment stimuli consisted of filter paper (4×2.2 cm) impregnated with H (2,000 µg) and covered with a piece of corrugated cardboard shelter (3×2.2 cm), and of VPCs formulated at a high dose (500 µg; Experiments 68-74) or a medium dose (50 µg; Exp. 75) in mineral oil (0.5 mL) and pipetted into the inverted lid of a 20-ml scintillation vial resting on top of the shelter (FIG. 19). Control stimuli were of identical design but the filter paper contained no H, and the mineral oil contained no VPCs.

Specifically, Experiment 68 tested the complete synthetic pheromone blend consisting of VPCs and H versus a control stimulus, whereas concurrently-run Experiment 69 tested a partial pheromone blend consisting of only VPCs versus a control stimulus.

In Experiment 68 (Table 12), 15 of the 16 male bed bugs that were tested individually responded to the complete pheromone blend, indicating that the complete blend contained all important bed bug pheromone components. In Experiment 69, in contrast, only 6 of the 16 male bed bugs tested responded to the partial pheromone blend consisting of VPCs without histamine, confirming that histamine is an important bed bug pheromone component (see also Tables 7-9), and that H serves the role of arresting bed bugs at a shelter once they have been attracted to it by the VPCs.

Table 12 illustrates the responses of adult male bed bugs to complete or partial synthetic pheromone blends comprising the volatile pheromone components (VPCs) (E)-2-hexenal, (E)-2-octenal, dimethyl disulfide, dimethyl trisulfide and 2-hexanone, and/or the less-volatile pheromone component histamine (H). VPCs in experiments 68-74 were tested at 500 µg and in experiment 75 at 50 µg. Histamine was tested at 2,000 µg. Experiments 68-69, 70-71, 72-73, and 74-75 were run concurrently.

| Exp. no. | Shelter 1 | Shelter 2 | No. insects in shelter 1 | No. insects in shelter 2 | No. insects not responding |
| --- | --- | --- | --- | --- | --- |
| 68 | VPC + H | unbaited | 15 | 0 | 1 |
| 69 | VPC | unbaited | 6 | 3 | 7 |
| 70 | H | unbaited | 12 | 1 | 5 |
| 71 | VPC + H | unbaited | 17 | 1 | 3 |
| 72 | VPC | H | 2 | 14 | 4 |
| 73 | VPC + H | unbaited | 15 | 1 | 4 |
| 74 | VPC + H | H | 17 | 5 | 3 |
| 75 | VPC + H | H | 10 | 0 | 6 |

To determine the effect of VPCs in the pheromone blend, we then tested concurrently histamine alone versus a blank control (Exp. 70), and the complete pheromone blend of VPCs and histamine versus a blank control (Exp. 71).

In Experiment 70 (Table 12), 12 bed bugs responded to the shelter with histamine-impregnated filter paper, whereas only one bed bug responded to the shelter with blank filter paper, indicating again that bed bugs are arrested in the presence of histamine. In Experiment 71, 17 bed bugs responded to the shelter associated with the complete pheromone blend of VPCs and histamine, and only one bed bug responded to the control shelter, suggesting that the complete pheromone blend was possibly more effective than the partial blend (tested in Exp. 70) in attracting or arresting bed bugs.

To compare further the relative importance of histamine and VPCs as bed bug pheromone components, we tested concurrently the responses of bed bugs to shelters baited with histamine or VPCs (Exp. 72), and the complete pheromone blend of VPCs and histamine versus a blank control (Exp. 73).

In Experiment 72 (Table 12), 14 bed bugs responded to shelter baited with histamine and two bed bugs responded to shelter baited with VPCs, indicating that histamine had a stronger effect on the bed bugs' decision which shelter to select. In Experiment 73, 15 bed bugs responded to shelter baited with the complete pheromone blend (VPCs+histamine) and only one bed bug responded to unbaited control shelter, confirming the superior effect of the complete bed bug pheromone blend.

With histamine strongly arresting bed bugs at a shelter (see Exp. 70 & 72 in Table 12), we then explored whether the effect of histamine could be enhanced by adding VPCs to histamine. Accordingly, we tested the responses of bed bugs to histamine or to histamine plus VPCs, both at high dose of VPCs (500 µg; Exp. 75) and at a medium dose of VPCs (50 µg; Exp. 74).

In Experiments 74 and 75, the complete pheromone blend of histamine plus VPCs at a high dose and at a medium dose attracted and arrested significantly more bed bugs than did histamine alone, clearly revealing a synergistic effect between VPCs (attracting bed bugs) and histamine (arresting bed bugs).

Example 15

Responses of Bed Bugs to Synthetic Pheromone Lures in a Heavily Infested Residential Apartment To determine whether bed bugs responded to synthetic pheromone lures not only in large arena laboratory bioassays but also in infested premises (residential apartments), we placed pheromone-baited shelter traps (see FIG. 19) in apartments with known or suspected bed bug infestations. The shelter was identical to that described in EXAMPLE 13 except that the histamine-impregnated filter paper or control filter paper was glued to the corrugated cardboard shelter for ease of shelter placements. Based on 24-hour trapping results in multiple apartments, we selected a single, heavily infested apartment (hereafter referred to as Room 106) for further testing of synthetic bed bug pheromone lures.

To obtain field evidence for synergistic interaction between the VPCs and histamine in synthetic pheromone lures (see Exp. 74 & 75 in Table 12), two consecutive sets of two experiments were run (Set 1: Exp. 76 and 77; Set 2: Exp. 78 and 79) in Room 106. Replicates (n=15-20) of each experiment consisted of paired shelters placed against a wall or furniture, with approximately 30-cm spacing between paired shelters and >1 m spacing between shelter pairs. For each shelter pair within each experiment, pheromone and control treatments were randomly assigned, and placement of replicates was alternated between the two experiments of Set 1 and Set 2. Because not more than 10 shelter pairs could be accommodated in Room 106 at any time, experimental data were collected over several consecutive 24-h periods. Every morning at 9:00, shelters were collected from Room 106 and immediately placed into separate labelled zipper lock bags which were then put on dry ice to kill the bed bugs that had entered a shelter. Bed bugs in each shelter were later counted in the laboratory under a microscope, noting their developmental stage ($1^{st}$, $2^{nd}$, $3^{rd}$, or $4^{th}$ instar, adult), sex (male, female), and evidence (or not) for blood feeding prior to entry into a shelter. Immediately following the removal of bed bug shelters from Room 106 each morning, new pre-prepared shelters were pheromone-baited (treatment) or not (control) and their position within shelter pairs randomly assigned (see above), again alternating placement of shelter pairs between Experiments 76 and 77 (Set 1) and between Experiments 78 and 79 (Set 2).

To determine the effectiveness of synthetic pheromone lures in the presence or absence of the volatile pheromone components (VPCs) (E)-2-hexenal, (E)-2-octenal, dimethyl disulfide, dimethyl trisulfide, 2-hexanone (that we predicted would attract bed bugs to a shelter), and the less volatile component histamine (that we predicted would retain bed bugs at a shelter), we compared the responses of bed bugs to complete and partial synthetic pheromone lures in Experiments 76 and 77, and in Experiments 78 and 79, with experiments in each set run concurrently.

In Experiment 76 we tested shelters baited with the complete synthetic pheromone lure (VPCs+histamine) versus unbaited shelters, and in Experiment 77 we tested shelters baited with VPCs only versus unbaited shelters. Analogously, in Experiment 78 we tested shelters baited with the complete synthetic pheromone lure (VPCs+histamine) versus unbaited shelters, and in Experiment 79 we tested shelters baited with histamine only versus unbaited shelters.

In Experiment 76 (Table 13), shelters baited with the complete synthetic pheromone blend attracted and retained, on average, 21.4 bed bugs compared to 4.8 bed bugs, on average, in control shelters. These data indicate that the complete synthetic pheromone lure had a significant effect on attracting and retaining bed bugs. Conversely, in Experiment 77 shelters baited with only the VPCs attracted and retained, on average, only 10.3 bed bugs compared to 4.7 bed bugs, on average, in control shelters.

Table 13 illustrates the responses of nymphal and adult bed bugs in a residential apartment to corrugated cardboard shelter traps (see FIG. 19) baited with the complete synthetic pheromone blend consisting of the volatile pheromone components (VPCs) (E)-2-hexenal, (E)-2-octenal, dimethyl disulfide, dimethyl trisulfide and 2-hexanone (total amount 500 µg) and of the less volatile pheromone component histamine (H) (2,000 µg), or baited with partial pheromone blends lacking either the VPCs or histamine. The pheromone-baited shelter and unbaited control shelter in each experimental replicate were separated by at least 30 cm, with ≥1-m spacing between replicates. There was alternate placement of replicates of concurrently run Experiments 76 and 77 (20 replicates each), and of concurrently run Experiments 78 and 79 (15 replicates each).

| Exp. no. | Bait* | Mean ± SE number insects in baited shelter | Mean (±SE) number insects in control shelter |
| --- | --- | --- | --- |
| 76 | VPCs + H | 21.4 ± 5.93 | 4.8 ± 1.82 |
| 77 | VPCs | 10.3 ± 3.45 | 4.7 ± 1.73 |
| 78 | VPCs + H | 24.86 ± 6.84 | 3.73 ± 1.43 |
| 79 | H | 6.06 ± 1.28 | 4.53 ± 1.8 |

The combined data from Experiments 76 and 77 reveal that the complete synthetic pheromone lure is superior to a partial pheromone lure (lacking histamine) in attracting and retaining bed bugs.

In Experiment 78 (Table 13), shelters baited with the complete synthetic pheromone blend attracted and retained, on average, 24.86 bed bugs compared to 3.73 bed bugs, on average, in control shelters. These data indicate again that the complete synthetic pheromone lure had a significant effect on attracting and retaining bed bugs. Conversely, in Experiment 79 shelters baited with a partial pheromone blend containing only histamine attracted and retained, on average, only 6.06 bed bugs compared to 4.53 bed bugs, on average, in control shelters.

The combined data from Experiments 76-79 reveal that the complete synthetic pheromone blend is most effective in attracting and retaining bed bugs. The superior performance of the complete synthetic pheromone blend is due to the combined effects of two types of pheromone components, the volatile components (VPCs) that attract bed bugs to a shelter, and the less-volatile pheromone component histamine that arrests bed bugs in a shelter after they have been attracted to it.

Pheromone-baited shelters contained all nymphal instars (fed and non-fed) as well as adult males and females (fed and non-fed), clearly indicating that the complete synthetic pheromone attracts and retains bed bugs irrespective of their developmental stage, gender or physiological condition.

Example 16

Responses of Bed Bugs to Synthetic Pheromone Lures in Residential Apartments with Light Bed Bug Infestations To ascertain whether bed bugs responded to the complete synthetic pheromone not only in residential apartments heavily infested with bed bugs (see EXAMPLE 15; Table 13) but also in apartments with very light bed bug infestations, trapping was done in eight residential apartments in three separate buildings where tenants suspected they had bed bugs according to reports of a pest management professional. In each of these apartments, bedding, mattresses and other furniture were carefully inspected for the presence of live bed bugs and for evidence of bed bug activity such as fecal spots on bed sheets. In Experiment 80, 1-5 pairs of bed bug shelter traps (see FIG. 19) were placed in each apartment for a total of 20 pairs. One shelter in each pair was pheromone-baited [VPCs: (E)-2-hexenal, (E)-2-octenal, dimethyl disulfide, dimethyl trisulfide, 2-hexanone (500 μg) plus histamine (2,000 μg)]; the other was left unbaited. Shelter placement and spacing within and between shelter pairs proceeded as described in EXAMPLE 15. Shelters were retrieved 24 h after the placement, immediately placed into labelled separate zipper lock bags and put on dry ice to kill all captured bed bugs.

In Experiment 80, 26 of 27 bed bugs captured were present in pheromone-baited shelters; only one bed bug was present in an unbaited control shelter. Shelter traps in all rooms in which at least one live bed bug was seen at the start of the experiment captured at least one bed bug.

These data indicate that the 6-component synthetic pheromone lure comprised of (E)-2-hexenal, (E)-2-octenal, dimethyl disulfide, dimethyl trisulfide, 2-hexanone and histamine is capable of attracting and retaining bed bugs in lightly-infested residential apartments and that this novel pheromone lure has the potential to become an effective tool for detecting bed bug infestations in residential and commercial premises.

Example 17

Evaluation of a Bed Bug Trap Against Adult Bed Bugs

Experiment 81 utilized bioassay arenas comprised of 19-liter plastic containers with paper toweling taped on the inside bottom to afford traction for walking bed bugs. Bed bugs were purchased from North Carolina State University. Prior to the initiation of testing, insects were observed for 72 hours to ensure robust health. Each arena received 15 adult bed bugs per 55-minute replicate and either an unbaited control bed bug trap according to an embodiment (e.g., as shown in FIGS. 1-15), a baited bed bug trap according to an embodiment (e.g., as shown in FIGS. 1-15), or a Hot Shot® Bed Bug Glue Trap (Spectrum Brands, Middleton, WI). The baited bed bug trap is baited with an attractant (150, 152, 154) that, when activated, releases the five VPCs listed in Example 15 [(E)-2-hexenal, (E)-2-octenal, dimethyl disulfide, dimethyl trisulfide, 2-hexanone]. Each treatment was replicated five times. Data were analyzed by ANOVA followed by Tukey's HSD test, $\alpha=0.05$.

The baited bed bug trap captured 4.2 bed bugs in 55 minutes; this catch was 2.6 times that in the same trap without an attractant lure and 10.5 times that in the Hot Shot® Bed Bug Glue Trap (Table 14). The mean catch in the baited bed bug traps was significantly greater than the mean catch in either of the other two traps, which were not different from each other. These data demonstrate that, when baited with a volatile attractant composition, the bed bug trap according to an embodiment has the potential to detect a bed bug infestation within one hour.

Table 14 Results of Experiment 81 (N=5 replicates) showing catches of bed bugs in arena olfactometers (15 adult bed bugs released per replicate) in 55-minute periods in attractant-baited and unbaited bed bug traps compared with the catch in a widely-available commercial trap.

TABLE 14

| Treatment | Mean catch in 55 minutes (±SE)* |
|---|---|
| Unbaited bed bug trap | 1.60 ± 0.87 b |
| Baited bed bug trap | 4.20 ± 0.37 a |
| Hot Shot ® Bed Bug Glue Trap | 0.40 ± 0.24 b |

*$F_{2, 12} = 11.7917$, $P = 0.0015$. Means followed by the same letter are not significantly different, Tukey's HSD test, $P < 0.05$.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

What is claimed is:

1. An insect trap comprising:
   a first housing;
   a reservoir defined by and completely enclosed by the first housing;
   a protrusion disposed within the reservoir and extending inward from an interior surface of the first housing, the protrusion configured to pierce a package disposed within the reservoir;
   an actuator connected to the protrusion such that when the actuator is moved, the protrusion moves with the actuator within the reservoir;
   a second housing moveably engaging the first housing;
   a trap chamber partially formed by the first and second housings and a floor;
   an inlet for permitting insects to enter and/or exit the trap chamber, the inlet being at least partially defined by the floor; and
   wherein the second housing is movable between a first position where the inlet is open and a second position where the inlet is closed.

2. The insect trap of claim 1, further comprising an adhesive coated on a surface of the floor.

3. The insect trap of claim 2, wherein the first housing comprises a bottom wall and wherein the floor is adhered to the bottom wall using at least a portion of the adhesive.

4. The insect trap of claim 1, wherein the first housing comprises a bottom wall and wherein the bottom wall forms the floor.

5. The insect trap of claim 4, further comprising an adhesive at least partially coating a surface of the floor.

6. The insect trap of claim 1, wherein the first housing comprises a bottom wall, and wherein at least a portion of the bottom wall adjacent to the floor is at an elevation above an elevation of the floor, forming a pit to trap insects therein.

7. The insect trap of claim 6, where the bottom wall rises in elevation from the inlet to a point in the trap chamber adjacent the floor.

8. The insect trap of claim 1, wherein the protrusion is a pin.

9. The insect trap of claim 1, further comprising an attractant configured to attract insects and to be disposed within the reservoir, wherein the attractant comprises an attractant composition configured to attract insects, a first package enclosing the attractant composition, and a second package enclosing the first package therein and configured to be impermeable to gas.

10. The insect trap of claim 9, wherein the first package includes an exterior wall that is configured to release the attractant composition through the exterior wall at a release rate from about 5 µg per day to about 500 µg per day.

11. The insect trap of claim 9, wherein the first package comprises polyvinyl chloride.

12. The insect trap of claim 11, wherein the second package comprises a sealed pouch fabricated from a high barrier polyethylene terephthalate layer, an aluminum foil layer, and a polyethylene coextruded film.

13. The insect trap of claim 1, wherein the first housing comprises:
   a first portion, the reservoir being disposed within the first portion of the first housing;
   a second portion spaced-apart from the first portion of the first housing; and
   a space defined between the first and second portions of the first housing;
   wherein the second housing is positioned over the space and movingly engaged with the first and second portions of the first housing to form the trap chamber and permit the second housing to move between the first and second positions.

14. The insect trap of claim 13, wherein a first tab extends from the first portion of the first housing into the space and a second tab extends into the space from the second portion of the first housing, and wherein the second housing includes a first detent configured to receive the first tab and a second detent configured to receive the second tab.

15. The insect trap of claim 14, wherein when the first and second tabs are engaged with the first and second detents, the second housing is held in the first position.

16. The insect trap of claim 15, wherein when the second housing is moved from the first position to the second position, the second housing is moved below the first and second tabs such that the first and second tabs act as a stop to hold the second housing in the second position.

17. The insect trap of claim 13, wherein a longitudinal chamber member connects the first portion of the first housing to the second portion of the first housing.

18. The insect trap of claim 17, wherein a plurality of interior channel walls extend perpendicularly from the longitudinal chamber member, forming a plurality of channels between each set of adjacent interior channel walls, each channel connected to the inlet when the second housing is in the first position.

19. The insect trap of claim 13, wherein the second housing slideably engages the first and second housing portions, enabling the second housing to slide between the first and second positions.

20. The insect trap of claim 1, wherein the first housing comprises a plurality of interior channel walls disposed within the trap chamber forming a plurality of sub-chambers, each sub-chamber connected to the inlet when the second housing is in the first position.

21. The insect trap of claim 1, wherein the first housing comprises a bottom wall disposed at the inlet that is configured to provide grip for insects crawling into the trap chamber via the inlet.

22. The insect trap of claim 1, wherein the trap chamber comprises a retention mechanism selected from the group consisting of histamine, a chemical toxin, diatomaceous earth, amorphous silica, and biological control agents.

23. The insect trap of claim 22, wherein the retention mechanism is a histamine-impregnated cellulose-based substrate disposed within the first housing.

24. An insect trap comprising:
   a first housing;
   a reservoir defined by and completely enclosed by the first housing;
   a protrusion extending from an interior surface of the first housing;
   an actuator disposed upon the first housing and configured to move the protrusion within the reservoir;
   a second housing moveably engaging the first housing;
   a trap chamber at least partially formed by the first and second housings and a floor;
   an inlet into the trap chamber;
   an outer package disposed within the reservoir and impermeable to gas;
   an inner package enclosed within the outer package, the inner package being permeable to gas; and
   an attractant composition disposed within the inner package;
   wherein the inner package is configured to release the attractant composition at a release rate from about 15 µg per day to about 400 µg per day; and
   wherein the second housing is movable between a first position, where the inlet is open, and a second position, where the inlet is closed and at least a portion of the second housing contacts the floor.

25. An insect trap comprising:
   a housing;
   a reservoir at least partially defined by the housing;
   a protrusion disposed within the reservoir and extending inward from an interior surface of the housing, the protrusion configured to pierce a package disposed within the reservoir;
   an actuator connected to the protrusion such that when the actuator is moved, the protrusion moves with the actuator within the reservoir;
   a substrate defining a plurality of channels and at least one inlet; and
   a trap chamber partially formed by the housing and the substrate;
   wherein the at least one inlet is configured to permit insects to enter and/or exit the trap chamber; and
   wherein the reservoir is external to the trap chamber.

* * * * *